(12) United States Patent
Hui

(10) Patent No.: US 7,219,120 B2
(45) Date of Patent: May 15, 2007

(54) SYSTEMS, METHODS AND PROTOCOLS FOR SECURING DATA IN TRANSIT OVER NETWORKS

(75) Inventor: Joseph S Hui, Thousand Oaks, CA (US)

(73) Assignee: Savvis Communications Corporation, Town & Country, MO (US)

( * ) Notice: Subject to any disclaimer, the term of this patent is extended or adjusted under 35 U.S.C. 154(b) by 796 days.

(21) Appl. No.: 10/190,495

(22) Filed: Jul. 9, 2002

(65) Prior Publication Data

US 2004/0010596 A1    Jan. 15, 2004

(51) Int. Cl.
*G06F 9/00*    (2006.01)
(52) U.S. Cl. .................. 709/105; 709/249; 709/225; 715/500.1; 713/100
(58) Field of Classification Search ............. 709/224, 709/225, 203, 228, 105, 227, 249; 370/467, 370/468; 379/52, 93.05; 715/500.1; 713/100
See application file for complete search history.

(56) References Cited

U.S. PATENT DOCUMENTS 6,625,170 B1 * 9/2003 Curry et al. .............. 370/467
6,668,043 B2 * 12/2003 Hyziak et al. .............. 379/52
6,785,704 B1 * 8/2004 McCanne ................ 718/105
2005/0149599 A1 * 7/2005 Rana et al. ............... 709/200

OTHER PUBLICATIONS

Joseph Hui; TLS Pathsec Protocol, http://www.ietf.org/proceedings/02mar/1-D/draft-ietf-tis-pathsec.00.txt Sep. 2001.

* cited by examiner

*Primary Examiner*—Khanh Dinh
(74) *Attorney, Agent, or Firm*—Kenyon & Kenyon LLP

(57) ABSTRACT

Methods, systems, and protocols are described for securing data in transit over networks. A communication session is initiated between a client and a server. One or more communication channels can be set up between the client and the server. Each established communication channel may have zero or more intermediary nodes that are selected by the client or by the server to process information exchanged between the client and the server via the communication channels.

62 Claims, 16 Drawing Sheets

SYSTEMS, METHODS AND PROTOCOLS FOR SECURING DATA IN TRANSIT OVER NETWORKS

RESERVATION OF COPYRIGHT

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

BACKGROUND

Aspects of the present invention relate to communications. Other aspects of the present invention relate to secure communications and to securing data in transit over networks such as the Internet.

In an era of communications, different aspects of daily lives, both personal and commercial, largely depend on quality of communications. Such quality may be measured in terms of convenience to access different means of communications as well as the types of support that a communication channel may provide to its users. With the advancement of technologies, communication users, more and more so, demand security, efficiency, possibility of transporting heterogeneous types of data, flexibility of selecting communication routes that are appropriate to the applications at hand, and the capability of dynamically monitoring the performance of a network through which traffic is carried.

Secure data transport is an essential aspect of modern communications. Secure data transport may require more than simply providing security to communication channels. In some applications, users may desire dynamic control of security measure being used in various communication channels as well as the manner in which such security measures should be enforced. Coupled with such a need for control of security is the need for capability of monitoring the execution of such control.

Efficiency in communications may be assessed with respect to different application needs. For example, the speed of transporting data may be essential to some applications. On the other hand, for others, the bandwidth resource used to transport data may also come into an efficiency consideration. Furthermore, some applications may evaluate efficiency in terms of whether certain necessary processing, such as data transformation, can be supported along a communication channel so that transported data may arrive at the information requesting user in a form that is meaningful.

In modern communications, for various reasons, flexibility is often needed. For instance, users may request data from heterogeneous communication devices. Different types of device may require that requested data arrive in different forms. For example, a user may request a web page encoded in hypertext markup language (HTML) from a personal data assistant (PDA) with a wireless connection. In this case, unless the HTML document is transformed into a document in wireless markup language (WML), the user may not be able to view the document properly. As another example, a user may request the same web page from a cellular phone without display capability. In this case, the content of the web page (text) may need to be converted into speech via a text-to-speech transformation during the transport.

Different user needs may also demand flexibility in communications. For instance, a user who is French speaking may request a web page having its content encoded in English. The requested web page, in this case, may need to be translated from English into French before a corresponding French web page reaches the end user. Based on particular needs of a communication session, a fixed communication channel may be configured to include intermediate nodes that have the capabilities to perform required functions. Different nodes in a communication channel may be assigned to perform distinct functions.

Problems arise when a fixed communication channel does not have any intermediate node capable of performing some required functions. It is very unlikely, if not impossible, that a fixed communication channel can meet dynamic requirements of all the applications it supports.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar parts throughout the several views of the drawings, and wherein:

DETAILED DESCRIPTION

Figure 1:
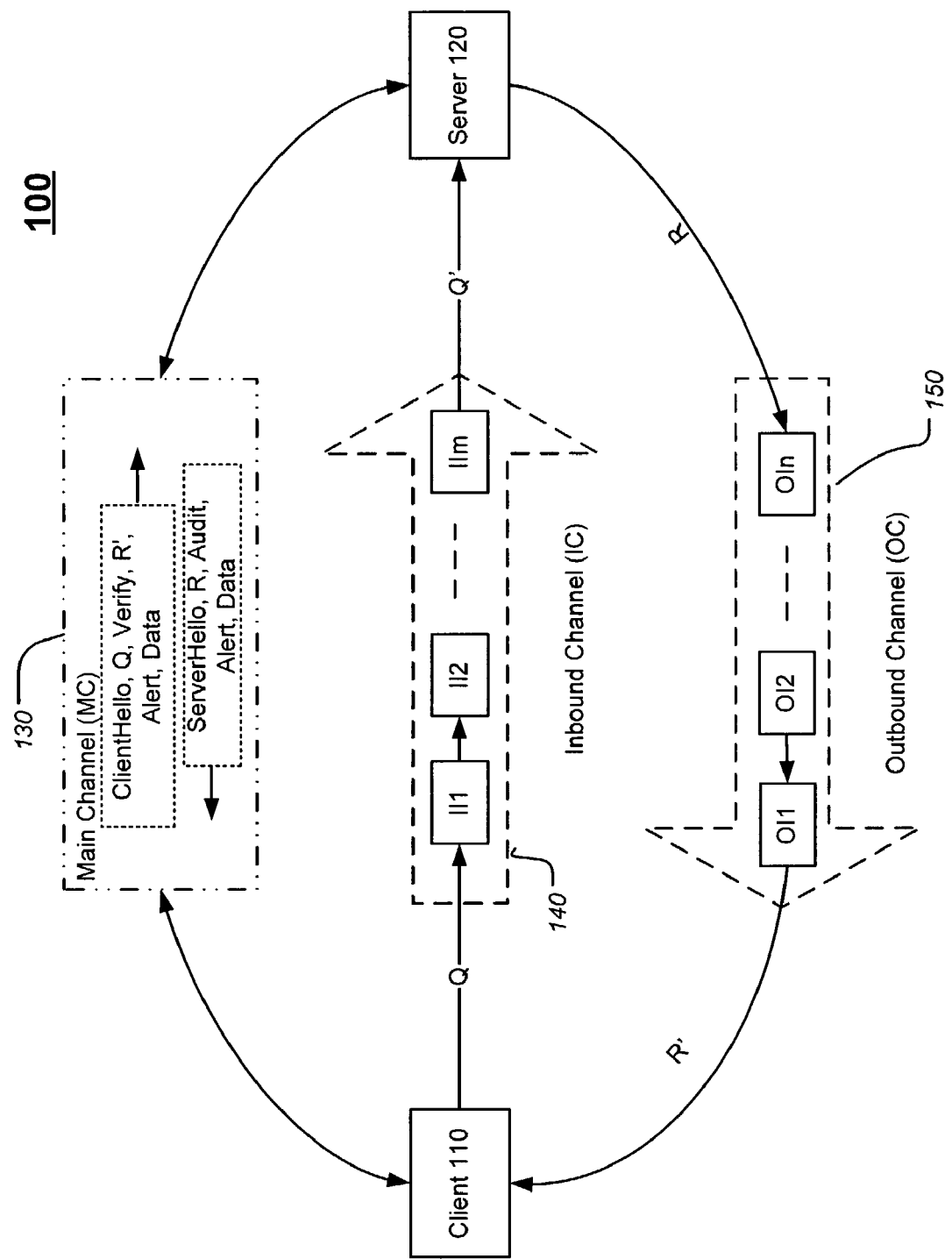
FIG. 1 depicts a generic architecture for communications, according to embodiments of the present invention.

FIG. 1 depicts a generic architecture 100 for secure communications, according to embodiments of the present invention. Communications according to the present invention may involve an architecture providing a platform for the secure communications as well as a protocol for securing data in transit over a network along a content processing pipeline. Such a pipeline comprises two end points and zero or more intermediaries en route, with semantics for negotiating security and routing policies between the end points. A communication session according to the present invention may refer to a communication session between two end points.

The end points may correspond to a server and a client, individually. Intermediaries, if any, may perform value-added service authorized by at least one end point. Generically, both end points and intermediaries may be termed as nodes along the pipeline. A communication session according to this invention may comprise one or more sub-sessions, each of which corresponds to a session between two immediately adjacent nodes, secured based on some protocol with extended semantics. One example of such protocol securing each sub-session is transport layer security (TLS). That is, in a communication session according to this invention, the server and all intermediaries may be individually authenticated according to, for example, the TLS protocol.

The architecture 100 depicted in FIG. 1 corresponds to a request-response computing model where a client 110, a server 120, and zero or more intermediaries form a linear processing path between them. Finite loops in a processing path are permissible, as the loops can be unfolded to stretch into a linear pattern. A server 120 may usually be an origin server but it may also be some other application entity such as an origin server's surrogate (or proxy). The client 110 may be a user agent, however, it may also correspond to some other application entity such as a caching proxy in a content delivery network.

The client 110, the server 120, and the intermediaries preferably form up to three individually secured channels for data and signal transports: a main channel (MC) 130, an outbound channel (OC) 150, and an inbound channel (IC) 140. In general, the terms "inbound" and "outbound" may be defined with reference to the request and response paths for messages. For example, "inbound" may refer to "traveling toward the origin server" and "outbound may refer to "traveling toward the user agent." In preferred embodiments, "inbound" means "traveling toward the server 120" where the server 120 may be an origin server or its surrogate/proxy and "outbound" means "traveling toward the client 110" where the client 110 may or may not correspond to a user agent.

Architecturally, a communication session according to embodiments of this invention is conducted over these three secured communication channels. The channels may be constructed at different stages of a communication session according to this invention. For example, they may be constructed at the beginning of a communication session during an initial set-up stage. They may also be constructed in the middle of a communication session through the use of, for example, alert signals (discussed later with reference to FIG. 5).

The main channel 130 connects the server 120 and the client 110 directly. The outbound channel 150 carries outbound data from the server 120 to the client 110 through zero or more outbound intermediaries (OI) (e.g., OI1 OI2,. . . , OIn). Conversely, the inbound channel 140 carries inbound data from the client 110 to the server 120 through zero or more inbound intermediaries (II) (e.g., II1 II2,. . . , IIm).

The existence of the main channel 130 may be mandatory. The outbound channel 150 and the inbound channel 140 may be optional. That is, whether to construct the inbound channel 140 or the outbound channel 150 may depend on application needs. In the absence of the outbound channel 150, the main channel 130 may be used to take over its functionality to perform secured delivery of outbound data (e.g., server responses). In the absence of the inbound channel 140, the main channel 130 may be used to carry out the functionality of the inbound channel to perform secured delivery of inbound data (e.g., client requests). In the absence of both outbound and inbound channels, a communication session according to this invention may operate in a degenerated mode with only one channel.

Main Channel

The main channel 130 preferably involves only the client 110 and the sever 120 with no intermediary in between. To set up the main channel 130, the client 110 initiates a handshake using some protocol (e.g., TLS handshake). Successful conclusion of such a handshake establishes the main channel 130. Upon a successful handshake, the server 120 may optionally issue an acknowledgement signal to the client 110 or to itself.

All alert signals may travel bi-directionally within the main channel 130. In the absence of outbound channel 150, outbound data (from server 120 to client 110), such as application server responses, may travel in the main channel 130. For example, a response from the server 120 to a request (e.g., verify) from the client 110 to verify (e.g., data fidelity) may travel in the main channel 130. In the absence of inbound channel 140, inbound data (from client 110 to server 120), such as application client requests, may also travel in the main channel 130. For example, a response from the client to a request (e.g., audit) from the server 120 to audit (e.g., data fidelity) may also travel in the main channel 130.

The main channel 130 is essential to a communication session according to preferred embodiments of this invention. A fatal error affecting the main channel 130 may result in immediate closure of the entire communication session. The main channel 130 may not share its security measures, such as pre-master and master secrets, with the inbound and the outbound channels, 140 and 150 respectively.

Outbound Channel

The outbound channel 150 is an outbound data channel between the server 120 and the client 110, with zero or more intermediaries en route. A hop connecting any two adjacent nodes along the outbound channel 150 is secured as a sub-session in the form, for example, of a TLS session. Other protocols may also be used for the same purpose. Therefore, the outbound channel 150 corresponds to a chain of secure sub-sessions, starting at the client 110 and ending at the server 120, inclusive.

An outbound intermediary (OI) is an intermediate node within the outbound channel 150 (e.g., OI1, OI2, OIn). There may be zero or more intermediaries in the outbound channel 150. In other words, the outbound channel 150 is formed through a chain of sub-sessions, hop by hop, between the client 110 and the server 120, inclusively. When there is no intermediary nods within the outbound channel 150, the outbound channel 150 is in its degenerate form with a single hop, where the client 110 plays the role of OI1 and the server 120 plays the role of OIn. In some embodiments, the number of intermediaries within the outbound channel 150 may be specified in an outbound routing metric via, for example, a size element associated with a hop list that defines the construct of the outbound channel 150 (discussed later with reference to FIG. 3).

Each outbound intermediary is identifiable through the outbound routing metric. To be consistent, the ordering of outbound intermediaries may be defined with respect to the direction from the client 110 to the server 120. For example, in FIG. 1, the first outbound intermediary in the outbound channel 150 is OI1 and it is the node immediately next to the client 110. That is, during channel construction, the client 110 is used as the source of the construction, irrespective of the direction in which the data travels. The construction of the outbound channel is hop-by-hop, starting from the client 110, and eventually linking to the server at the last hop, ending at the server 120. Once the outbound channel 150 is set up, a node within the channel always reads from upstream (server direction) and writes to downstream (client direction).

As mentioned above, parameters used in constructing the outbound channel 150 are specified as outbound routing metric, which may result from a negotiation between the client 110 and the server 120. The outbound routing metric may be sent from the server 120 to the client 110 via the main channel 130. When the client 110 initiates the handshake, it may send the server 120 a hello message (e.g., a ClientHello message in TLS) which contains various routing parameters related to opening a communication session from the perspective of the client 110.

When the server 120 receives the hello message from the client 110, it may negotiate the client's parameters and generate its own routing parameters. The negotiated routing parameters, coupled with the routing parameters generated from the server's perspective, may then be sent, as a server's hello message, back to the client 110. This may correspond to part of the handshake. In its response to the client's request, the server 120 may specify specific routing parameters related to the outbound channel. For example, it may specify, in the outbound routing metric, the number of nodes, the identities of the nodes, and the sequence of hops. It may also specify other information such as whether the client 110 and the outbound intermediaries are permitted to modify certain terms contained in the outbound routing metric.

The outbound channel 150 may be constructed hop-by-hop, with the first hop between the client 110 and the first outbound intermediary OI1 Upon receiving the outbound routing metric from the server 120, the construction may be initiated by the client 110. Each hop may be constructed based on the outbound routing metric in a manner following certain protocol (e.g., perform a client-OI1 TLS handshake). Upon the completion of the construction of the initial hop, the outbound routing metric is passed from the client 110 to the outbound intermediary OI1 Based on the outbound routing metric passed from the client 110, the outbound intermediary OI1 connects to the next intermediary, if any, designated in the outbound routing metric, and repeats the handshake procedure with the outbound intermediary OI2.

At each hop, after the completion of the hop construction, certain terms in the outbound metric may be updated. For example, there may be a parameter in the outbound routing metric to indicate how many remaining hops are to be constructed or there may be a pointer pointing at the current hop to be constructed. Such parameters may be updated at each hop. The recursive hop construction continues until the end of the channel with the last hop having the server 120 as the terminus.

Other routing metrics may be used in constructing the outbound channel. For example, the outbound routing metric may provide a property that indicates whether some master secret is to be shared with the nodes in the outbound channel 150. In some embodiments, all nodes in the outbound channel 150 may share a common master secret. In these cases, the client 110 may be responsible for propagating a fixed set of keying material towards the server 120 through each and every intermediary in the outbound channel 150. Examples of keying material include pre-master secret, client channel ticket, or server channel ticket. With propagated keying material, all nodes within the outbound channel are to use such set of keying material for sub-session key generation.

In alternative embodiments, the nodes in the outbound channel 150 may not share a common master secret. In these cases, each sub-session along the outbound channel may hold its own keying secrets. As will be discussed later, the outbound channel may not share any secret with the inbound channel 140.

Prior to transporting application data via the established outbound channel 150, the server 120 may first authenticate the channel. To do so, the server 120 may send a signal, via the main channel 130, to the client 110 that requests the client 110 to echo the signal via the outbound channel 150 back to the server 120. For example, the server 120 may send a pinging signal, (discussed later with reference to FIG. 5,) to the client 110 that designates the outbound channel 150 as the echo channel. Upon receiving the pinging signal, the client 110 may reply with an echo signal (also discussed later with reference to FIG. 5,) via the outbound channel 150. The server 120 then examines the echo signal to determine if the outbound channel 150 has been compromised. Upon positive authentication, the server 120 may inform the client 110 by means of an acknowledgement signal.

After the outbound channel 150 has been established, the server 120 may at any time audit the outbound channel 150, for the purpose of, say, assessing the quality of service (QoS) of the outbound intermediaries. (channel audit will be discussed later with reference to FIG. 14.)

Inbound Channel

The inbound channel 140 is an inbound data channel from the client 110 to the server 120, with zero or more intermediaries en route. Each pair of immediately adjacent nodes along the inbound channel forms a sub-session, corresponding to a hop. That is, a hop may be a direct path between two adjacent nodes. Each sub-session according to the present invention may be secured using certain protocol such as TLS, in which case a sub-session may be secured in the form of a TLS session. Thus, the inbound channel 140 may be formed as a chain of sub-sessions, starting at the client 110 and ending at the server 120.

An inbound intermediary (e.g., II1) is an intermediary within the inbound channel 140 and may be identifiable, for example, through an inbound routing metric. The ordering of the inbound intermediaries (II1 II2,. . . , IIm) may be consistently defined as starting from the client 110 and ending at the server 120. For example, the first inbound intermediary Il1 corresponds to the node immediately next to the client 110, as shown in FIG. 1.

Issues related to setting up the inbound channel 140 may be handled in a similar fashion as what has been previously discussed for the outbound channel 150. For example, the procedure in constructing the outbound channel or the routing metric used for specifying channel construction parameters may be similarly applied to the inbound channel 140. In the case of constructing the inbound channel 140, the routing metric used may be termed as inbound routing metric with similar semantics as the outbound routing metric.

To construct the inbound channel 140, the client 110 sends a "hello" message to the server 120, via the main channel 130, which may carry various routing parameters with respect to the inbound channel 140. Upon receiving the client's hello, the server 120 may negotiate the parameters associated with the inbound channel and generate its own "hello" message with updated terms for the inbound channel (as well as the routing metric about the outbound channel 150). The server's "hello" may then be sent back to the client 110, both as an acknowledgement to the client's "hello" and also as a negotiated outcome about how the inbound and outbound channels should be set up. The server 120 may utilize existing protocol to send its "hello" message (e.g., a ServerHello message in TLS).

Upon receiving the server's hello message, the client 110 may follow the similar procedure applicable to constructing the outbound channel 150 to construct the inbound channel 140. For example, the inbound channel 140 may be constructed based on inbound routing metric, hop-by-hop in the order starting from the hop between the client 110 and the first inbound intermediary Il1 and ending at the last hop between the inbound intermediary Ilm and the server 120. At each hop, the inbound routing metric may be applied in a similar fashion as how the outbound routing metric is applied to the construction of the outbound channel 150.

The inbound routing metric may also specify other types of parameters related to the inbound channel 140. For example, they may indicate whether the intermediaries of the inbound channel are permitted to revise the terms regarding the channel set up. They may also indicate whether the inbound channel is permitted to share its pre-master and master secrets with the outbound channel 150.

During the construction of the inbound channel 140, the inbound routing metric is passed from node to node and some of the semantics in the inbound routing metric may be updated from hop to hop. An example of such semantics is a pointer pointing at the ending node of the next hop.

In some embodiments, setting up the inbound channel 140 may be carried out in a different fashion than how the outbound channel 150 is set up. For example, the inbound routing metric may include different semantics or alternative kinds of routing parameters may be adopted to enforce different security measures to the inbound channel 140. The construction itself may also be implemented using a different construction procedure. The described embodiments are merely for illustration purposes and they do not limit the scope of the present invention. The determination of adopting a specific embodiment in a particular application may be made according to the requirements associated with the application.

Similarly to the outbound channel 150, the inbound channel 140 may be established either during the initial set up stage or in the middle of a communication session. A communication session according to this invention may not necessarily require existence of the inbound and outbound channel. In that case, the communication may be conducted over the main channel 130. During a communication session, the server 120 or the client 110 may initiate a request to set up the outbound channel 150. Similarly, the server 120 or the client 110 may also, during a communication session, request to establish an inbound channel 140. The authentication of the inbound channel 140 may follow a same procedure as described with respect to the outbound channel 150.

In some embodiments, a channel may be established during a communication session according to this invention due to a failure in auditing or verifying an existing channel. For example, when the server 120 audits the outbound channel 150 established earlier, the audit result may indicate that the existing outbound channel does not meet required standards. In such cases, the server 120 may first request that the existing outbound channel to be torn down (to be discussed later with reference to FIG. 5 and FIG. 11) and then set up a new outbound channel (to be discussed in reference to FIGS. 5 and 12). The client 110 may also re-establish a new outbound channel if it determines that the quality of service (QoS) over an existing outbound channel is not satisfactory.

State Machine of a Secure Communication Session

Figure 2:
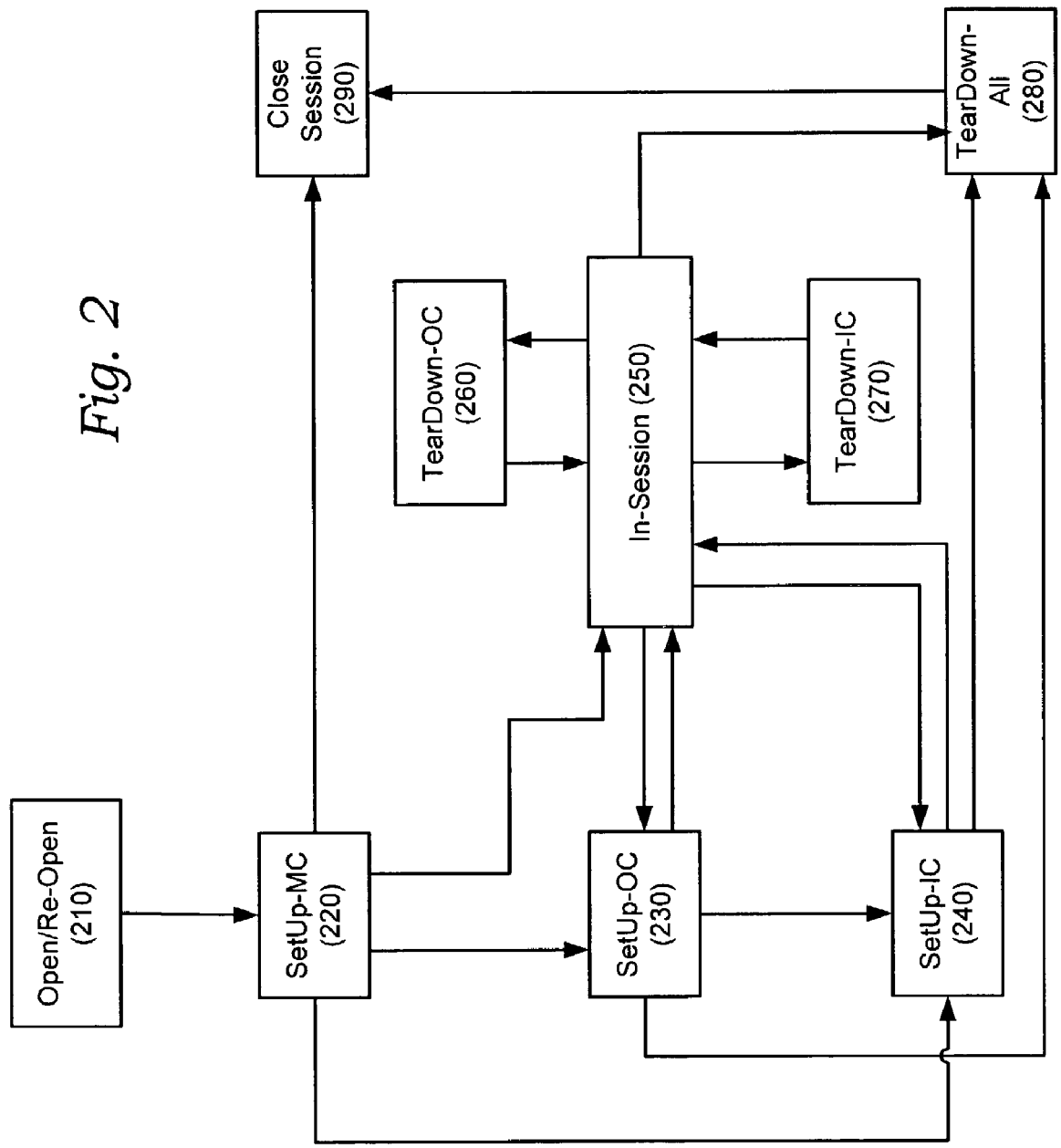
FIG. 2 describes an exemplary state machine illustrating both different states as well as transitions among these states during a communication session, according to embodiments of the present invention.

FIG. 2 describes an exemplary state machine that illustrates different states of a communication session and the transitions among these states, according to embodiments of the present invention. The exemplary embodiment illustrated in FIG. 2 comprises a total of nine states: an open/re-open state 210 in which a communication session is initiated, a Set-up-MC state 220 in which the main channel 130 is to be established, a Set-up-OC state 230 in which the outbound channel 150 is to be established, a Set-up-IC state 240 in which the inbound channel 140 is to be established, an in-session state 250 in which the client 110 and the server 120 communicate in a secure communication session, a Teardown-OC state 260 in which the outbound channel 150 is to be torn down, a Teardown-IC state 270 in which the inbound channel 140 is to be torn down, a Teardown-all state 280 in which all channels (main channel 130, the inbound channel 140, and the outbound channel 150) are to be torn down, and a Close-Session state 290 in which the entire communication session is to be closed.

The transitions among these different states may be triggered under different conditions. For example, when an attempt to set up the main channel 130 fails at the Set-up-MC state 220, it may transit, upon, for example, a fatal error, to the Close-Session state 290. If the main channel 130 is successfully set up, it may transit from the Set-up-MC state 220 to Set-up-OC state 230 or to In-Session state 250. If setting up the outbound channel 150 fails, it may transit to the Teardown-All state 280 to tear down all the channels that have been previously set up before it further transits to the Close-Session state 290. If the outbound channel 150 is successfully set up, it may transit from the Set-up-OC state 230 to Set-up-IC state 240 or to In-Session state 250. If setting up the inbound channel 140 fails, it may transit to the Teardown-All state 280 to tear down all the channels that have been previously set up before it may further transit to the Close-Session state 290. Once entering the In-Session state 250, either the client 110 or the server 120 may request to tear down either the inbound channel 140 or the outbound channel 150. In these situations, the transition may occur moving from the In-Session state 250 to either the Teardown-IC state 270 or the Teardown-OC state 260.

It is also possible to request to set up the inbound (or outbound) channel while at the In-Session state 250. For example, a communication session may be established using only the main channel 130 first. During the communication session, the server 120 may send a signal to the client 110 to request to set up the outbound channel 150. In this case, the communication session may first transit from the In-Session state 250 to the Set-up-OC state 230 and then transit back upon a successful set up. Each state is described in more detail below.

Open/re-open state 210 represents an open state in which the client 110 requests to open a communication session. The client 110 may also enter the Open/re-open state 210 whenever it attempts to re-open a secure communication session. To open a communication session, the client 110 may first enter into state Set-up-MC 220 to set up the main channel 130. In the Set-up-MC state 220, the client 110 initiates a handshake with the server 120 by, for example, sending a "ClientHello" message to the server 120.

In the client's "hello" message, the client may specify outbound routing metric which may be subject to negotiations on the server's part. For example, the outbound routing metric may specify the nodes to be used to route outbound messages (from the server 120 to the client 110). Each of such outbound nodes may perform some pre-defined functionality on the data traveling through it. For example, a node may take a web page content in English from the server 120, translate the web page into French, and then deliver the French web page to the client 110.

If the initial handshake is unsuccessful, the client 110 may transit into close session state 290 to abort the communication session. There may be different ways to determine a failure in setting up the main channel 130. For example, the client 110 may receive a message from the server 120, explicitly indicating a fatal error. Alternatively, the system may rely on a time-out mechanism. If the client 110 does not receive any message from the server 120 (either as an acknowledgement or an error message) after a fixed time-out period, the client 110 may assume that there is an error. The error may be due to an unreasonable delay in the network or non-responsiveness of the server 120.

If the initial handshake is successful, the client 110 receives a hello message (e.g., a ServerHello message) from the server 120. The server's hello message may contain both inbound routing metric as well outbound routing metric. The returned inbound routing metric may be resulted from the initial inbound routing metric sent by the client 110 in the ClientHello message and corresponding to negotiated inbound routing metric. The server 120 may have changed some of the original inbound routing metric. For example, an initial inbound routing metric may indicate that a loose source routing scheme is to be intended (to be discussed in reference to FIGS. 4(a) and 4(b)), under which an inbound intermediary may add its own (additional) intermediaries. Upon receiving such original inbound routing metric, the server 120 may revise the inbound routing metric so that it permits only a strict source routing scheme (discussed with reference to FIGS. 4(a) and 4(b)) under which no intermediary is allowed to add its own intermediaries.

If the server 120 decides that it wants to set up an outbound channel, the server's "hello" message may also include outbound routing metric that specifies various channel parameters related to how an outbound routing channel should be set up. For example, it may specify the length of the outbound channel (in terms of the number of hops), the outbound intermediaries to be used, the routing scheme (e.g., strict source routing or loose source routing), or how each hop is to be secured along the outbound routing channel.

Upon receiving a ServerHello message from the server 120 (i.e., the initial handshake is successful), the client 110 may enter the Setup-OC state 230 to set up the outbound channel according to the outbound routing metric carried over via the ServerHello message. Upon a successful set up, the client 110 may further set up the inbound channel 140 and enters the Setup-IC state 240. If either set-up process fails, the client 110 may abort the communication session. The client 110 may enter first into the Teardown-All state 280 to tear down the channels that have previously been set up for the session (e.g., the outbound channel 150 and the main channel 130) and then move to the Close-Session state 290 to terminate the communication session. If the required set-up is successful, the two end points (the client 110 and the server 120) enter into the In-Session state 250.

In the In-Session state 250, either the client 110 or the server 120 may request to tear down an established channel (other than the main channel). For example, if the server 120 recognizes, via audit, that the outbound channel 150 is not operating to its satisfaction, it may request to tear down the existing outbound channel and re-set-up a new outbound channel. In this case, the communication session may transit from the In-Session state 250 to the Teardown-OC state 260, transit back to the In-Session state 250, transit to the Setup-OC state 230, and eventually transit back to the In-Session state 250. Similarly, the client 110 may request the same with respect to the outbound channel 140.

The client 110 or the server 120 may also, during a communication session, request to set up a channel that has not been set up. For example, the main channel 130 may be adequate initially for the communication between the client 110 and the server 120. During the communication session, needs may arise that requires different channels be established. For instance, a web page in English may need to be converted into French using a particular node as an intermediary to perform the translation. In this case, it may transit from the In-Session state 250 to the Setup-OC state 230. The exemplary state machine illustrated in FIG. 2 describes the overall dynamics related to a communication session according to the present invention.

Routing Metrics

Inbound and outbound channels are designated via inbound and outbound routing metrics, respectively. A routing metric may designate the hops involved in a communication channel from the client 110 to the server 120. For example, it may define the nodes used in constructing a channel as well as parameters associated with such construction such as the length of the channel and the security measures adopted at each hop. A routing metric may also define specific routing policy to be enforced along the underlying channel. For example, a routing metric may specify a strict source routing policy. Alternatively, it may also specify a loose source routing policy. An inbound routing metric describes all the parameters related to the inbound channel 140, comprising one or more hops from the client 110 to the server 120. Similarly, an outbound routing metric describes all the parameters related to the outbound channel 150, comprising one or more hops from the client 110 to the server 120.

Figure 3:
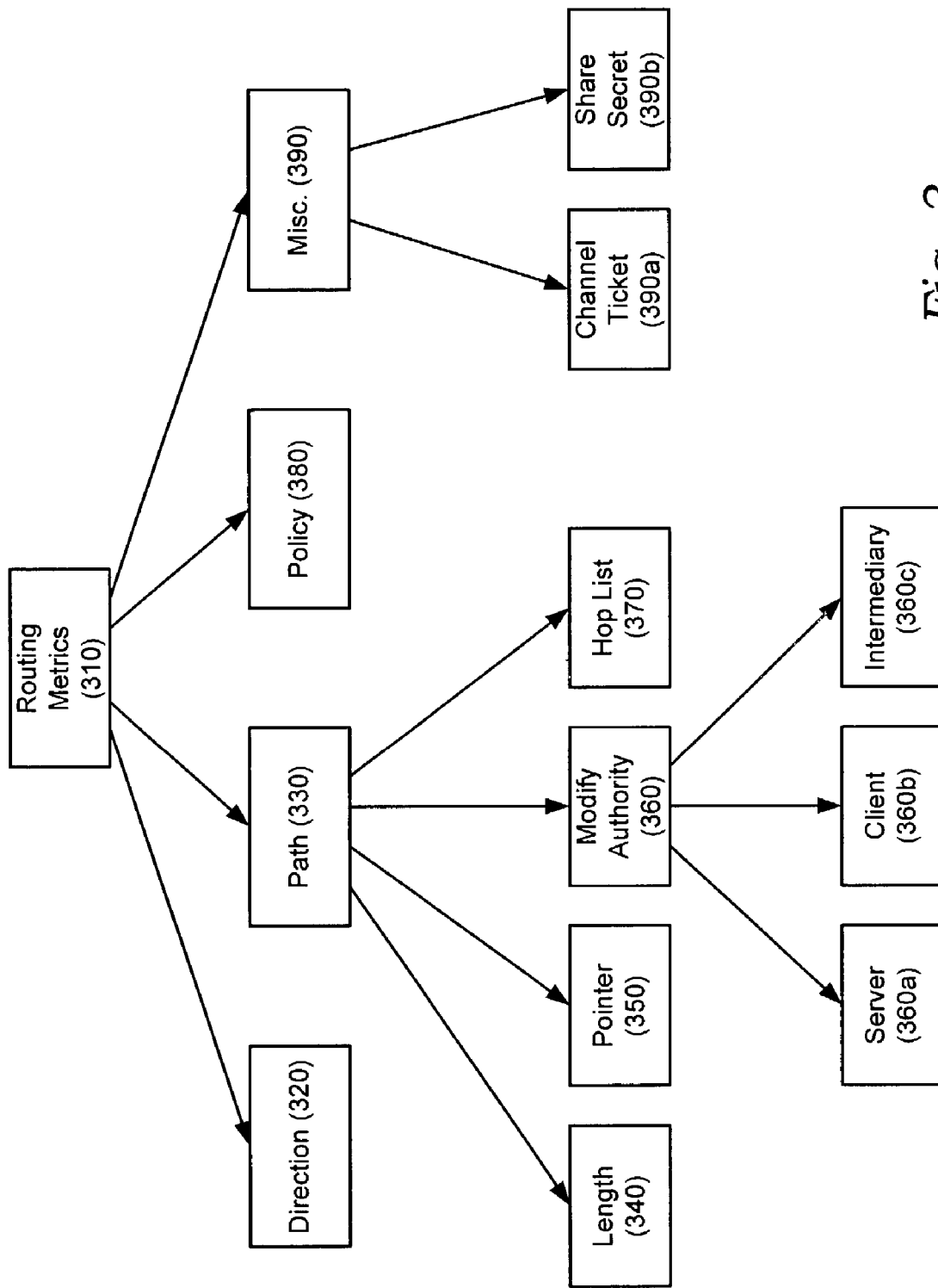
FIG. 3 illustrates an exemplary construct of a generic routing metric, according to embodiments of the present invention.

Inbound routing metric and outbound routing metric may be structured in a similar way. FIG. 3 illustrates an exemplary generic construct of a routing metric, according to the present invention. A routing metric 310 may comprise a plurality of types of information. They may include, but are not limited to, routing direction information 320, path related information 330, routing policy 380 adopted, and miscellaneous 390. The direction information 320 indicates whether the metric is for inbound or outbound. The path information 330 provides detailed description of the underlying channel. For example, it may include a length 340 of the designated path, i.e., the number of hops in the channel, a pointer 350 pointing at a hop of the channel, a specified modify authority 360 defining who is authorized to modify the initially designated path, and a hop list hop list 370 listing all the nodes to be used to form the underlying channel.

The length of a path (340) may indicate the number of hops in the path, which may be measured in terms of: Length=N+1, where N is the number of intermediary nodes used in the path. For example, if three intermediaries are used in an outbound channel, the length of the channel is four. The pointer 350 may be used to point at the server of a current hop. For example, initially, the pointer 350 in an inbound routing metric may point at the first inbound intermediary I1, which is the server in the initial hop between the client 110 and the I1 (FIG. 1). The value of the pointer 350 may correspond to the ordering number of the current server (e.g., pointer is 1 for the first hop) in the pertinent routing metric. The pointer 350 may be updated dynamically while the underlying channel is constructed hop to hop. For instance, once the first hop between the client 110 and the intermediary is constructed, the pointer 350 may be updated to 3, pointing at the second inbound intermediary, which is the server node of the next hop between the intermediary and the intermediary, and so on.

Figure 4B:
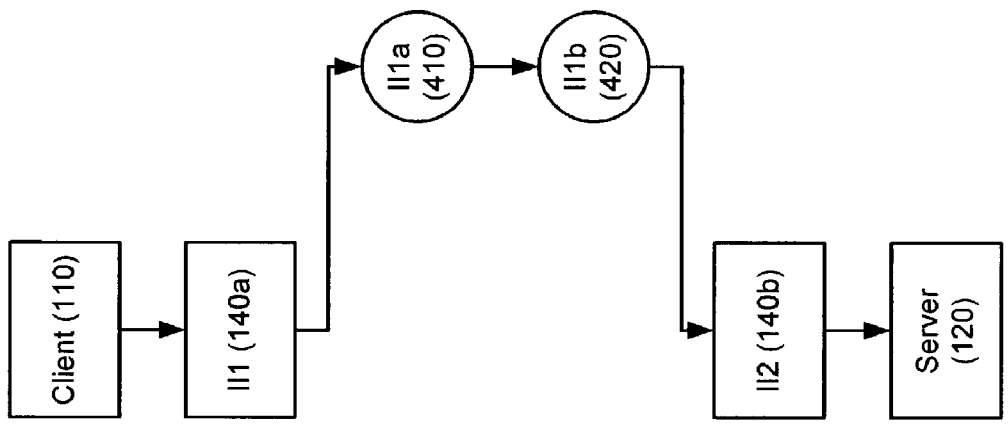
FIG. 4(b) describes an exemplary inbound channel with loose source routing scheme, according to embodiments of the present invention.
Figure 4A:
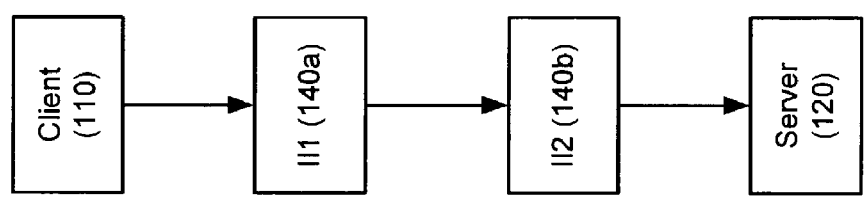
FIG. 4(a) describes an exemplary inbound channel with strict source routing scheme, according to embodiments of the present invention.

The modify authority 360 defines who may be authorized to revise the originally designated path. For example, the modify authority 360 may specify that only the server 120 is authorized to make changes (server authority 360a). It may also specify that the client 110 may also change the original designation (client authority 360b). Another alternative is to also allow intermediaries to make changes (intermediary authority 360c). Changes made to an original path include, but are not limited to, adding additional intermediaries between the modifying node and the server 120. This relates to the underlying routing scheme such as strict source routing or loose source routing. FIGS. 4(a) and 4(b) illustrate these two exemplary routing schemes.

FIG. 4(a) describes an exemplary inbound channel with four nodes (the client 110, the server 120, and two intermediaries I1 140a and I2 140b) with strict source routing (SSR) scheme. With this scheme, the client 110 and the intermediaries are not allowed to add their own intermediaries. That is, the nodes involved in the path are what is specified (or approved by the server 120) in the corresponding inbound routing metric (i.e., the client 110, node I1, node I2, and the server 120). With an SSR scheme, the server 120 may assert its routing decision over the path, which may not be altered by the client 110 or any intermediaries.

FIG. 4(b) describes an exemplary inbound channel with loose source routing scheme (LSR). The loose source routing scheme works in similar ways as SSR does, with the exception that either the server 110 or an intermediary may, if permitted by the server 120 and made explicit in the inbound routing metric (via modify authority 360), add their own intermediaries into the path. For example, the first intermediary I1 in FIG. 4(b) adds two intermediaries (I1a 410 and I1b 420) between itself and the next node I2. With a LSR scheme, the server 120 may not have full control of what constitutes an underlying path whereas the client 110 and the intermediaries may have the flexibility to expand the path.

The hop list 370 that may provide an entire list of hops constituting the underlying path. Different conventions may be utilized to specify such a list. A hop list may be represented using comma as delimiter between different nodes. For example, a hop list corresponding to the three-hop path illustrated in FIG. 4(a) using such a convention may be: "I1.b.com:234, I2.c.com:46,server.d.com:789". Here, the name prior to the colon (":") may correspond to the host name and the number after the colon (":") may associate with a particular port used for the communication at that node. With this example, the length information 340 may be accordingly set to be 3, i.e., the number of hops, the initial value for the pointer 350 may be set to be 1, and the server may be the only one set to be authorized to modify (360a) the hop list.

When new intermediaries are added under a loose source routing (LSR) scheme, various related information may be dynamically updated, including the length information 340, the pointer 350, and the hop list 370. In addition, when a routing metric is passed from hop to hop, the pointer 350 is to be updated. Each node in a channel may use the pointer 350 as the locator for determining its hop server (in a sub-session) and connect to the hop server only when the pointer 350 is not greater than the length 340. When the pointer 350 has a value greater than the length information 340, a node may realize that it has reached the end of the channel.

In some situations, it is also possible that a pointer value corresponding to the server 120 may not necessarily indicate the end of a path. It is also possible that at the end of the path, some particular operation may need to be performed. For instance, the last intermediary in the channel, e.g., I2 140b, may be required to perform a special operation to authenticate to the server that the channel has not been compromised. The operation may take the form of challenge-and-response, where the last intermediary must respond correctly to a challenge originated by the server in order to convince the server of the channel's integrity. To trigger such an operation, the end intermediary may be made aware that it is the last intermediary when the pointer 350 has a value that is equal to the value of the path length 340.

Other types of routing parameters may be specified under the miscellaneous 390. For instance, channel ticket 390a may be incorporated to provide a ticket for the underlying channel. Shared secret information 390b may indicate whether a master secret can be shared among all nodes within the underlying channel for keying purposes.

A routing metric may be realized under different implementations. It may be realized as a platform independent object, which can be marshaled through networks. It may also be designed as an attachment to some other existing objects. In some embodiments, it may be realized as an extended object type to some existing standard with open or reserved extensions. For example, in one exemplary embodiment of this invention, a routing metric may be incorporated into TLS ServerHello or ClientHello messages as an extension. In a different embodiment, a routing metric may also be incorporated into a TLS alert via a similar extension.

With this realization, a routing metric may be sent from a hop to another hop via the TLS alert mechanism. The client 110 may first send a ClientHello message with inbound routing metric to the server 120 to set up the main channel 130 to initiate the communication. Upon receiving the ClientHello message, the server 120 may negotiate the terms of the inbound routing metric (sent with the ClientHello message). For example, the server 120 may choose to enforce strict source routing scheme even though the client 110 may have specified in the original inbound routing metric to enforce a loose source routing scheme.

The server 120 may also generate outbound routing metric (if an outbound channel is to be established). To deliver both the negotiated inbound routing metric and the outbound routing metric to the client 110, the server 120 may send (via the main channel) a ServerHello message with both routing metrics incorporated using extension pathsec_rm. In this manner, when the client 110 receives the ServerHello message, it may use the routing metric (either inbound or outbound or both) to set up channels according to the received routing metric.

Below, an exemplary implementation of the pathsec_rm extension is shown to be used to extend existing TLS extensions and it is to be included in either the ServerHello or ClientHello messages as applicable. Table 1 enumerates an extended TLS extension types as specified in the Transport Layer Security (TLS) Extensions document by the TLS Working Group of the Internet Engineering Task Force (IETF), with pathsec_rm as an addition:

TABLE 1

```
Enum {
  server_name(0),
  max_fragment_length(1),
  client_certificate_url(2),
  trusted_ca_keys(3),
  Truncated_hmac(4),
  Status_request(5),
  pathsec_rm(6),         /* added extension for Pathsec */
  (65535)
} ExtensionType;
```

Using such added extension, an exemplary PathsecRoutingMetric data structure may be constructed to incorporate a routing metric as shown in Table 2 below under this extension.

TABLE 2

```
struct {
  RoutingPolicy routingPolicy;
  RouteLength routeLength;
  RoutePointer routePointer;
  RouteDirection routeDirection;
  ShareMasterSecret shareMasterSecret;
  ServerMayModHopList serverMayModHopList;
  ClientMayModHopList clientMayModHopList;
  IntermMayModHopList intermMayModHopList;
  Opaque serverRandom[32]; /* also serves as channel ticket */
  Opaque pathsecReserved[64];
  Opaque hopList<1..2^14>
} PathsecRoutingMetric;
Enum {
  Loose_source_routing(0x83), /* 0x83 & 0x89 are what is used in IP routing */
  Strict_source_routing(0x89)/* default */
} RoutingPolicy;
Typedef uint8 RouteLength;
Typedef unit8 RoutePointer;
Enum {
  Outbound(1),
  Inbound(2)
} RouteDirection; /* no default */
Enum {
  Don't_share_master_secret(0),
  Share_master_secret(1) /* default */
```

TABLE 2-continued

```
} ShareMasterSecret;
Enum {
  Server_may_not_modify_hop_list(0),
  Server_may_modify_hop_list(1) /* default */
} ServerMayModRM;
Enum {
  Client_may_not_modify_hop_list(0),
  Client_may_modify_hop_list(1) /* default */
} ClientMayModRM;
Enum {
  Interm_may_not_modify_hop_list(0), /* default */
  Interm_may_modify_hop_list(1)
} IntermMayModRM;
HopList := hops
Hops := hostport [, hops]
Hostport := host [: port]
Host := hostname | hostnumber
Hostname := ialpha [. hostname]
Hostnumber := digits . digits . digits . digits
port := digits
```

Either the server 120 or the client 110 may be the originator of a routing metric. For example, the server 120 may become the originator if the client 110 does not include routing metric in a ClientHello message (i.e., the client 110 does not intend to set up an inbound channel). The data items in the above example implement the types of routing metrics described in FIG. 3.

RoutingPolicy represents the policy to be adopted and it may be determined by the originator of the routing metric. The routing policy governs a channel, which may enforce, for example, loose source routing or strict source routing. RoutingPolicy, once set, may not be changed. In this case, all nodes along the channel may be required to execute the defined routing policy in the exact manner as described in RoutingPolicy.

RouteLength specifies the number of hops in the hopList and it may be a numeric value, e.g., such as 3 indicating there comprise a total of three hops in the channel. The RoutePointer may serve to point at the destination node of a current hop. RoutePointer may be updated hop by hop, each time incrementing by 1.

RouteDirection indicates if the routing metric is for inbound or outbound application data. For example, if RouteDirection=outbound, then the routing metric is for an outbound channel (hence an outbound routing metric). ShareMasterSecret indicates whether all nodes belonging to the channel are to share a common master secret for keying purposes.

ServerMayModHopList indicates if the server 120 may modify the underlying hopList. ClientMayModHopList indicates if the client 110 may modify the underlying hopList. IntermMayModHopList indicates if the intermediaries may modify the underlying hopList. ServerRandom may contain a channel ticket for keying purpose. This feature may be set when it is indicated that all nodes share a common master secret (indicated in ShareMasterSecret). A channel ticket may be used to uniquely identify a channel. For example, when the server 120 is connected to a plurality of channels, the server 120 can recognize each individual channel based on the channel ticket. PathsecReserved may be retained as a dummy to allow future revisions to the structure.

HopList comprises the list nodes en route. The first node in the list may always start with I1 or O1 and the last node may always be the server 120. This is due to the fact that the construction of a channel, both inbound and outbound, preferably starts from the client 110. As discussed earlier, a hop list may be constructed using certain conventions. In the illustrated exemplary structure, the HopList may comprise a plurality of node separated by commas and each node may be expressed as "host:port" wherein the host may represent an identification of the node and the port may refer to a particular port at the host to be used for data transport purposes. All nodes in a channel may observe the rules set in various routing parameters, such as routingPolicy, routeDirection, shareMasterSecret, serverMayModHopList, clientMayModHopList, intermMayModHopList, and hopList, with possibly some exceptions.

Exemplary exceptions include, but are not limited to, that the server 120 may negotiate or re-set routing metrics prior to effectuating them. For example, the server 120 may change loose_source_routing to strict_source_routing; the server 120 may negotiate server_may_not_modify_hop_list to server_may_modify_hop_list; the server 120 may determine to change interm_may_modify_hop_list to interm_may_not_modify_hop_list; or the server 120 may also negotiate share_master_secret to dont_share_master_secret. In addition, the client 110 may not be allowed to perturb the server-side hops specified by the server 120, though it may be allowed to prepend client-side hops to hopList. At the same time, the server 120 may not perturb the client-side hops specified by the client 110, though it may append server-side hops to them.

The pathsec_rm extension shown above illustrates one embodiment to implement the routing metric mechanism according to the present invention. It is presented for mere presentation purposes and is not limiting the scope of the invention. A routing metric mechanism may also be implemented independent of an existing standard. That is, the routing metric mechanism may not necessarily have to be effectuated via an existing standard. For example, it may be developed and supported entirely independently.

Alert Signals

While a routing metric may be carried using a pathsec_rm extension in a ServerHello or a ClientHello message during initial set up stage of the communication, it may also be carried in an alert signal during the course of the communication. In addition, during a communication session, besides data transport, nodes may need to communicate with each other. For example, the client 110 may once in a while need to verify the quality of service (QoS) along the outbound channel 150. The server 120 may also audit the outbound channel 150 to make sure that it is functioning to satisfaction. In addition, when needs arise, either the client 110 or the server 120 may request to tear down certain channel when the performance of the channel is beyond tolerance.

In some embodiments of the present invention, the client 110 and the server 120 are able to send their routing metrics during the course of a communication session. In this embodiment, the mechanism of alert signal is exploited to allow either the client 110 or the server 120 to send routing metric with the pathsec_rm extension.

To facilitate such an ability, the exemplary embodiment of the present invention may utilize an existing standard to append its own features. One example is to extend the TLS alerts data structure to include an optional element, incidentally named: "extension." The TLS data structure can be found in "The TLS Protocol, Version 1.0" (aka RFC2246) published by the TLS Working Group of the Internet Engineering Task Force (IETF), the contents of which are incorporated herein by reference. The protocol according to this invention may then introduce necessary terms under said "extension" optional element. For example, a new alert level called "notification" and a new alert type "pathsec_signal" may be added to the TLS alert data structure.

The notification level may be introduced for accommodating such alerts whose severity is neither warning nor fatal error. The recipient of a signal at notification level may process the signal according to what the underlying application requires. It may decide that the alert can not be ignored. It is also possible that a particular application may decide not to support the alert type at all so that when it receives such an alert signal, it simply ignores the alert.

In some illustrated embodiments of the present invention, a signal may be stored in a data structure such as presented in Table 4 below, and the (PathsecAlert) data structure may, in turn, be cast into an extended TLS Alert data structure, under the storage area named "extension", as shown in Table 3, which also shows a "notification" alert level as an extension to the existing TLS AlertLevel enumeration. The original data structures specific to TLS without the enhancements according to the present invention can be found in both the TLS Protocol Version 1.0 specification (RFC 2246) and the Transport Layer Security (TLS) Extensions document by the TLS Working Group of the Internet Engineering Task Force (IETF).

TABLE 3

```
struct {
    AlertLevel level;
    AlertDescription description;
    opaque extension<0..2 16-1>;      /* new addition for Pathsec */
} Alert;
enum {
warning(1),
fatal(2),
notification(3),                     /* new addition for Pathsec */
(255)
} AlertLevel;
enum {
Close_notify(0),
Unexpected_message(10),
bad_record_mac(20),
Decryption_failed(21),
Record_overflow(22),
Decompression_failure(30),
Handshake_failure(40),
bad_certificate(42),
Unsupported_certificate(43),
Certificate_revoked(44),
Certificate_expired(45),
Certificate_unknown(46),
Illegal_parameter(47),
Unknown_ca(48),
Access_denied(49),
Decode_error(50),
Decrypt_error(51),
export_restriction(60),
protocol_version(70),
insufficient_security(71),
internal_error(80),
user_canceled(90),
no_renegotiation(100),
unsupported_extension(110),
certificate_unobtainable(111),
unrecognized_name(112),
bad_certificate_status_response(113),
bad_certificate_hash_value(114),
pathsec_signal(120),                 /* new addition for Pathsec */
(255)
} AlertDescription;
```

In illustrated embodiments, an alert with type pathsec_signal may be used, through which pathsec_signal_data may carry routing metrics using pathsec_rm extension accompanying a pathsec_set_up_oc or pathsec_set_up_ic signal. In this way, routing metrics may be carried outbound in a ServerHello message with pathsec_rm extension, inbound in a ClientHello message with pathsec_rm extension, or in pathsec_signal_data accompanying a pathsec_set_up_oc or pathsec_set_up_ic signal. That is, routing metrics may be communicated both during the initial set-up stage as well as during the in-session period of a communication session.

Signals according to embodiments of this invention may also be developed independent of any existing standard. It may not necessarily have to be effectuated via an existing standard. For example, this may be developed and supported entirely independently.

Signals

Figure 5:
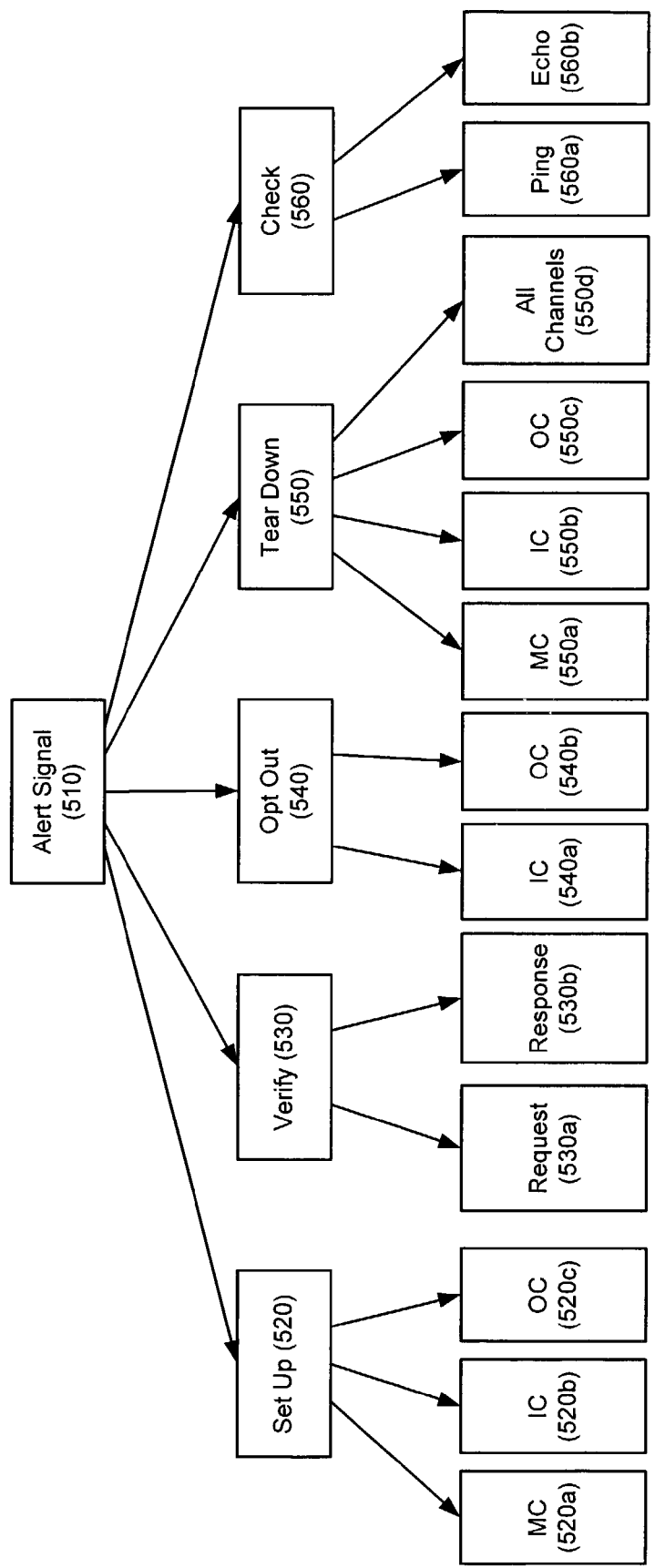
FIG. 5 illustrates exemplary types of alert signals, according to embodiments of the present invention.

In embodiments of the present invention, with pathsec_signal type extended into an existing standard, different types of alert signals may be incorporated under this signal type. FIG. 5 illustrates exemplary types of alert signals (510). There may be, first of all, different categories of signals. In FIG. 5, five exemplary categories of signals are described: signals related to setting up channels (520), signals related to verifying channels (530), signals related to opting out of channels (540), signals related to tearing down channels (550), and signals related to checking the status of the channels (560).

Each category may further include signals addressing particular aspects of the underlying purposes. For example, a signal related to setting up a channel (520) may be a signal to set up the main channel 130 (520a), the inbound channel 140 (520b), or the outbound channel 150 (520c). A signal related to verifying the performance of a particular channel may include a signal from the client to verify the QoS of the outbound channel 150 or from the server to audit the outbound channel 150. To initiate the verification (or audit), the initiating node may first send a request signal (530a) and the node being verified may send a response signal (530b) to respond to the request. When a particular channel does not perform well, the verifying node (e.g., the server 120) may decide to opt out of that channel. To do so, the verifying node may send an opt-out signal, either a signal to indicate to opt out of the inbound channel (540a) or the outbound channel (540b).

A node may also elect to opt out of a channel for other reasons. For example, without failure of the outbound channel 150, the server 120 may nevertheless elect to opt out of the outbound channel in order to, for example, deliver a particular piece of information to the client 110 via the main channel 130. Once a node determines to opt out of a channel, subsequent communication may be through the main channel 130.

A channel may be torn down during a communication session. This may be due to performance reason or reasons not related to the performance. When such a need arises, an initiating node may send a tear-down signal (550) to indicate to tear down the channel. Depending on the channel(s) to be torn down, the initiating node may send a tear down MC signal (550a) to bring down the main channel, a tear down IC signal (550b) for the inbound channel 140, a tear down OC signal (550c) for the outbound channel 150, or a tear down all signal (550d) to bring down all channels. In a particular implementation, the order in which channels are torn down may have a substantial impact in maintaining the integrity of the system. For example, it may be essential to tear down the main channel 130 the last. Similarly, an implementation to tear down all channels (following a request based on tear down all signal 550d) may also need to consider the impact of the order in tearing down channels to the system.

Through signals, a node may also initiate a request to a destination node to perform certain checks. For example, the server 120 may send the client 110 a ping signal (560a) to, for example, check which version of the protocol that is supported at the destination node. Upon receiving the ping signal 560a, the destination node may send back an echo signal 560b as a response.

The above illustrated types of signals may be delivered via a TLS alert with pathsec_signal extension. All nodes may be capable of relaying signals. Such relay may be downstream. A signal may affect all nodes along a path, including the end point(s) where it terminates. Signals may be realized using pathsec_signal extension and may be cast into a PathsecAlert data structure illustrated in Table 4.

TABLE 4

PathsecAlert data structure struct {
    PathsecSignal pathsec_signal_type;
    Opaque pathsec_signal_data<0..2^15-1>;
} PathsecAlert;
Enum {
Pathsec_set_up_mc(1),
Pathsec_mc_set_up(2),
Pathsec_set_up_oc(3),
Pathsec_oc_set_up(4),
Pathsec_set_up_ic(5),
Pathsec_ic_set_up(6),
Pathsec_tear_down_mc(7),
Pathsec_mc_torn_down(8),
Pathsec_tear_down_oc(9),
Pathsec_oc_torn_down(10),
Pathsec_tear_down_ic(11),
Pathsec_ic_torn_down(12),
Pathsec_tear_down_all(13),
Pathsec_verify_request_start(14),
Pathsec_verify_request_end(15),
Pathsec_verify_response_start(16),
Pathsec_verify_response_end(17),
Pathsec_opt_out_oc(18),
Pathsec_opt_out_oc_ack(19),
Pathsec_opt_out_oc_nack(20),
Pathsec_opt_out_ic(21),
Pathsec_opt_out_ic_ack(22),
Pathsec_opt_out_ic_nack(23),
Pathsec_source_route_failed(24),
Pathsec_feature_unsupported(25),
Pathsec_ping(26),
Pathsec_echo(27),
Pathsec_echo_ok(28),
(255)
} PathsecSignal;

Each of the enumerated signal types in the PathsecAlert data structure is described in detail below.

pathsec_set_up_mc

The client 110 or the server 120 may optionally send a pathsec_set_up_mc to itself (e.g., for invoking a pathsec_set_up_mc callback). Upon receiving this signal, the client 110 or the server 120 may enter the Set-up-MC state 220 (FIG. 2).

pathsec_mc_set_up

Either the client 110 or the server 120 may optionally send or receive a pathsec_mc_set_up upon exit of the Set-up-MC state 220. Upon exiting the Set-up-MC state 220, the node may enter into the Set-up-OC state 230 (if the outbound channel is to be set up), the Set-up-IC state 240, or the In-Session state 250.

pathsec_set_up_oc

The server 120 may send this signal to the client 110 via the main channel 130, and optionally to itself. The receiver of this signal may enter the Set-up-OC state as a response. The pathsec_signal_data accompanying this signal contains a PathsecRoutingMetric, where routing parameters may be set for the purposes of establishing the outbound channel 150 (e.g., routeDirection=outbound). The client 110 may start constructing the outbound channel 150 according to such received outbound routing metric. The server 120 may listen for an outstanding outbound channel connection request, at the server port specified or implied (e.g., as default) by the outbound routing metric.

pathsec_oc_set up

The server 120 may send a pathsec_oc_set_up signal to the client 110 via the main channel 130, and optionally to itself, upon exiting the Set-up-OC state 230 to indicate that the outbound channel has been set up.

pathsec_set_up_ic

The server 120 may send this pathsec_set_up_ic signal to the client 110 via the main channel 130, and optionally to itself. The receiver of this signal may enter into the Set-up-IC state 240. The pathsec_signal_data accompanying this signal contains a PathsecRoutingMetric, where routeDirection=inbound, (i.e., it is an inbound routing metric). The client 110 may start constructing the inbound channel according to the inbound routing metric. After sending out this signal, the server 120 may listen for an outstanding inbound channel connection request at the server port specified or implied (e.g., as a default) by the inbound routing metric.

The client 110 may also send this signal (pathsec_set_up_ic) to the server 120, enclosing in pathsec_signal_data an inbound routing metric with "client-side" hops. In this case, the server 120 may optionally append "server-side" hops to the "client-side" hops, by inserting "server-side" nodes in front of the last node in the given hopList. For example, given a hop list such as "cs1, cs2, svr", the server 120 may insert nodes ss1 and ss2 and append the hop list into "cs1, cs2, ss1, ss2, svr." The server 120 may then send back to the client 110 a pathsec_set_up_ic, with a newly negotiated inbound routing metric.

pathsec_ic_set_up

The server 120 may send pathsec_ic_set_up to the client 110 via the main channel 130, and optionally to itself, upon exiting the Set-up-IC state 240 to indicate that the inbound channel has been set up.

pathsec_tear_down_mc

This signal is to inform to tear down the main channel 130. In a particular implementation, this signal may or may not be allowed, depending on the requirements of the realization. One reason for not allowing tearing down of the main channel may be that when the main channel is torn down, it may have an adverse impact on the integrity of the entire system.

pathsec_mc_torn_down

This signal acknowledges that the main channel has been torn down. Similarly, in a particular implementation, if the main channel is not allowed to be explicitly torn down, this signal may not be used.

pathsec_tear_down_oc

The server 120 may, at any time, send via the outbound channel 150 the client 110 a pathsec_tear_down_oc signal, and vice versa. Both the signal sender and receiver may enter the TearDown-OC state 260 immediately. Each intermediary en route may immediately forward the signal downstream, and then enter the TearDown-OC state itself. In addition, the server 120 and the client 110 may notify their respective applications of this signal, and any data that is pending for either read or write may be flushed.

pathsec_oc_torn_down

The server 120 may send a pathsec_oc_torn down signal to the client 110 via the main channel 130C, and optionally to itself, upon exiting the TearDown-OC state 260 to acknowledge that the outbound channel has been successfully torn down.

pathsec_tear_down_ic

The server 120 may, at any time, send via the inbound channel 140 the client 110 a pathsec_tear_down_ic signal, and vice versa. Both the signal sender and receiver may enter the TearDown-IC state 270 immediately. Each intermediary en route may immediately forward the signal downstream, and then enter the TearDown-IC state itself. The server 120 and the client 110 may further notify their respective applications of this signal and any data pending for either read or write may be flushed.

pathsec_ic_torn_down

The server 120 may send a pathsec_ic_torn_down signal to the client 110 via the main channel 130, and optionally to itself, upon exiting the TearDown-IC state 270 to indicate that the inbound channel has been torn down.

pathsec_tear_down_all

The server 120 may at any time send via the main channel 130 the client 110 a pathsec_tear_down_all signal, and vice versa. Both the signal sender and receiver may enter the TearDown-All state 280 immediately. Pathsec_tear_down_all signals the imminent closure of the underlying communication session. Upon receiving this signal, all channels are to be torn down as soon as possible, with some provisions such as appropriate input output flushing prior to that. The server 120 and the client 110 may notify their respective applications of this signal and any data pending for read or write may be flushed.

pathsec_verify_request_start

The server 120 may send via the main channel 130 the client 110, and vice versa, a pathsec_verify_request_start signal to initiate a process to verify the data fidelity in the outbound channel 150.

pathsec_verify_request_end

The server 120 may send via the main channel 130 the client 110, and vice versa, a pathsec_verify_request_end signal to terminate the process of verifying the data fidelity in the outbound channel 150.

pathsec_verify_response_start

The receiver of a pathsec_verify_request_start signal may respond with a pathsec_verify_response_start signal to indicate that verification data is forthcoming.

pathsec_verify_response_end

The receiver of a pathsec_verify_request_end signal may respond with a pathsec_verify_response_end signal to indicate the end of verification data.

pathsec_opt_out_oc

The server 120 may send via the main channel 130 the client 110, and vice versa, a pathsec_opt_out_oc signal to tear down the outbound channel 150. The signal sender may employ a time out mechanism (e.g., with a pathsec_opt_out_oc_nack) if it does not receive a pathsec_opt_out_oc_ack in a certain amount of time.

pathsec_opt_out_oc_ack

The client 110 or the server 120 may send via the main channel 130 a pathsec_opt_out_oc_ack to acknowledge the receipt of a pathsec_opt_out_oc signal, prior to entering the TearDown-OC state 260. Upon receiving a pathsec_opt_out_oc_ack signal, the sender of a pathsec_opt_out_oc signal may enter into the TearDown-OC state 260.

pathsec_opt_out_oc_nack

Upon timing out on a pathsec_opt_out_oc signal, the pathsec_opt_out_oc signal sender may issue itself and optionally to the pathsec_opt_out_oc signal receiver a pathsec_opt_out_oc_nack signal, via the main channel 130.

pathsec_opt_out_ic

The server 120 may send via the main channel 130 the client 110, and vice versa, a pathsec_opt_out_ic signal to tear down the inbound channel 140. The signal sender may employ a time out mechanism (e.g., with a pathsec_opt_out_ic_nack signal) if it does not receive a pathsec_opt_out_ic_ack in a certain amount of time.

pathsec opt_out_ic_ack

The client 110 or the server 120 may send via the main channel 130 a pathsec_opt_out_ic_ack signal to acknowledge the receipt of pathsec_$_{opt_}$out_oc signal, prior to entering the TearDown-OC state 260. Upon receiving pathsec_opt_out_ic_ack, the pathsec_opt_out_oc sender may enter the TearDown-IC state 270.

pathsec_opt_out_ic_nack

Upon timing out on a pathsec_opt_out_ic signal, the sender of the pathsec_opt_out_ic signal may send itself and optionally to the pathsec_opt_out_ic receiver a pathsec_opt_out_ic_nack, via the main channel 130.

pathsec_source_route_failed

This signal may be used to alert a fatal error. It may be sent in either downstream or upstream direction. For example, an intermediary, in case of a local fatal error, may send a pathsec_source_route_failed signal in both upstream and downstream directions. This signal is fatal to the channel. Upon receiving a pathsec_source_route_failed signal, the server 120 and the client 110 may independently signal pathsec_tear_down_oc (or pathsec_tear_down_ic as applicable). The client and server applications may be notified of the source route failure. The channel torn down may be re-constructed, provided that at least one application layered above Pathsec commands the server 120 or the client 110 to signal pathsec_set_up_oc (or pathsec_set_up_ic as applicable). If the effect of this signal may adversely impact the entire system, it may not be used for the purposes described.

pathsec_feature_unsupported

Through this signal, a node that is requested (by either the client 110 or the server 120) to perform a task that it does not support may inform the signal sender that the function requested is currently unsupported. The signal may be sent upstream and it may then be relayed to the requester.

The server 120 may send a pathsec_ping to the client 110, and vice versa, through, for example, the main channel 130, for different purposes. For example, the server 120 may want to authenticate a channel that might have been constructed without client authentication during earlier handshake(s). One illustration of this latter case may be the following: an invalid last intermediary may gain "acquaintance" with the server 120 using replay attack with an intercepted channel ticket embedded in a ClientHello message, if during the construction of each hop in a channel, the communication server did not previously demand the communication client to authenticate itself. In this case, the server 120 may sometimes initiate such an inquiry to determine the security. Another example of such an inquiry may be that the server 120 may want to know the highest version supported by a node.

The node that initiates the inquiry may be called a pinger. The node that is being inquired may be called an echoer. A pinger may send an inquiry to an echoer via a different type of signal. One exemplary implementation for a ping-echo signal mechanism is illustrated in Table 5.

TABLE 5

Struct {
uint16 ping_id;
uint16 echo_channel_id;
uint8 ping_major;
uint8 ping_minor;
unit8 echo_major;
uint8 echo_minor;
opaque random[32];
} PathsecPing;
Struct {
uint16 ping_id;
uint16 echo_channel_id;
uint8 ping_major;
uint8 ping_minor;
unit8 echo_major;
uint8 echo_minor;
opaque random[32];
} PathsecEcho;

In the above illustrated structure (Table 5), the PathsecPing data structure may embody the signal for pinging purposes while the PathsecEcho data structure may embody the information that is necessary to echo a pinging signal.

Ping_id may be realized for tracking pings and echoes. Its value may be set by the pinger and may not be modified by the echoer or relays. The ping_id value set may be unique within an echo channel and it may wrap around. Echo_channel_id indicates the channel via which the PathsecEcho may travel. Its value may also be set by the pinger and may not be modified by the echoer or relays. There may be a set of pre-defined values for this field. For example, the pre-defined values may be set as: 0 refers to the main channel 130, 1 refers to the outbound channel 150, and 2 refers to the inbound channel 140.

Fields ping_major and ping_minor may be used to indicate the highest major and minor numbers of the version the pinger supports. A pinger may instantiate ping_major and ping_minor with correct values and it may also set echo_major and echo_minor to zero.

Fields echo_major and echo_minor may be used to indicate the highest major and minor numbers of the version the echoer (of a PathsecPing) supports, starting, for example, from major 1, minor 0. An echoer, who is the originator of a PathsecEcho in reply to a PathsecPing, may instantiate echo_major and echo_minor with correct values.

Major number being a particular value (e.g., 0) may indicate that the version is experimental. Experimental versions may have non-zero minor numbers. PathsecEcho.random may contain the random bytes copied from EchosecPing.random, which may be initially generated by the pinger for the purpose of authenticating the echo channel. The last intermediary, or the client 110 in the case where there is no intermediary, in the echo channel may reverse the byte sequence of PathsecEcho.random if necessary (i.e., the first byte becomes the last, the last byte becomes the first, and so on) prior to forwarding the PathsecEcho to its destination, which may be the server 120.

pathsec_echo_ok

A pinger may keep a copy of the PathsecPing signal sent. Upon receipt of a PathsecEcho, the pinger may compare the ping_id's and echo_channel_id's in the PathsecPing and PathsecEcho for equal matches. Additionally, the pinger may reverse the byte sequence in PathsecEcho.random and compare PathsecPing.random to PathsecEcho.random. If the two random values are equal, then the echo channel may be considered as authenticated and a pathsec_echo_ok signal may be sent to the echoer, accompanied by the PathsecEcho with the PathsecEcho.random in an original byte sequence (originally set by the pinger). Otherwise, the last intermediary may be deemed an imposter due to the fact that it failed to decipher the PathsecEcho (in order to reverse the bytes in PathsecEcho.random). In this case, an "insufficient security" fatal alert may be raised. As a consequence, application data may not be allowed to travel in the inbound and outbound channels unless the channel in question has been "certified" for use by a pathsec_echo_ok signal. The pinger may discard the PathsecPing copy that it kept after processing the corresponding PathsecEcho.

A pinger may pack a pathsec_signal_data signal with a PathsecPing. Upon receiving the pinging request, the echoer may copy (or cast) a PathsecPing into a PathsecEcho, assigning proper values to echo_major and echo_minor and then emitting the PathsecEcho (e.g., in pathsec_signal_data) via a channel indicated in the echo_channel_id field. The PathsecPing sender (i.e., pinger) may also time out if the expected PathsecEcho fails to arrive within a reasonable time limit.

All intermediaries relaying a PathsecEcho towards its destination, except the last intermediary next to the pinger in the echo channel, may not modify the content of a PathsecEcho.

Figure 6:
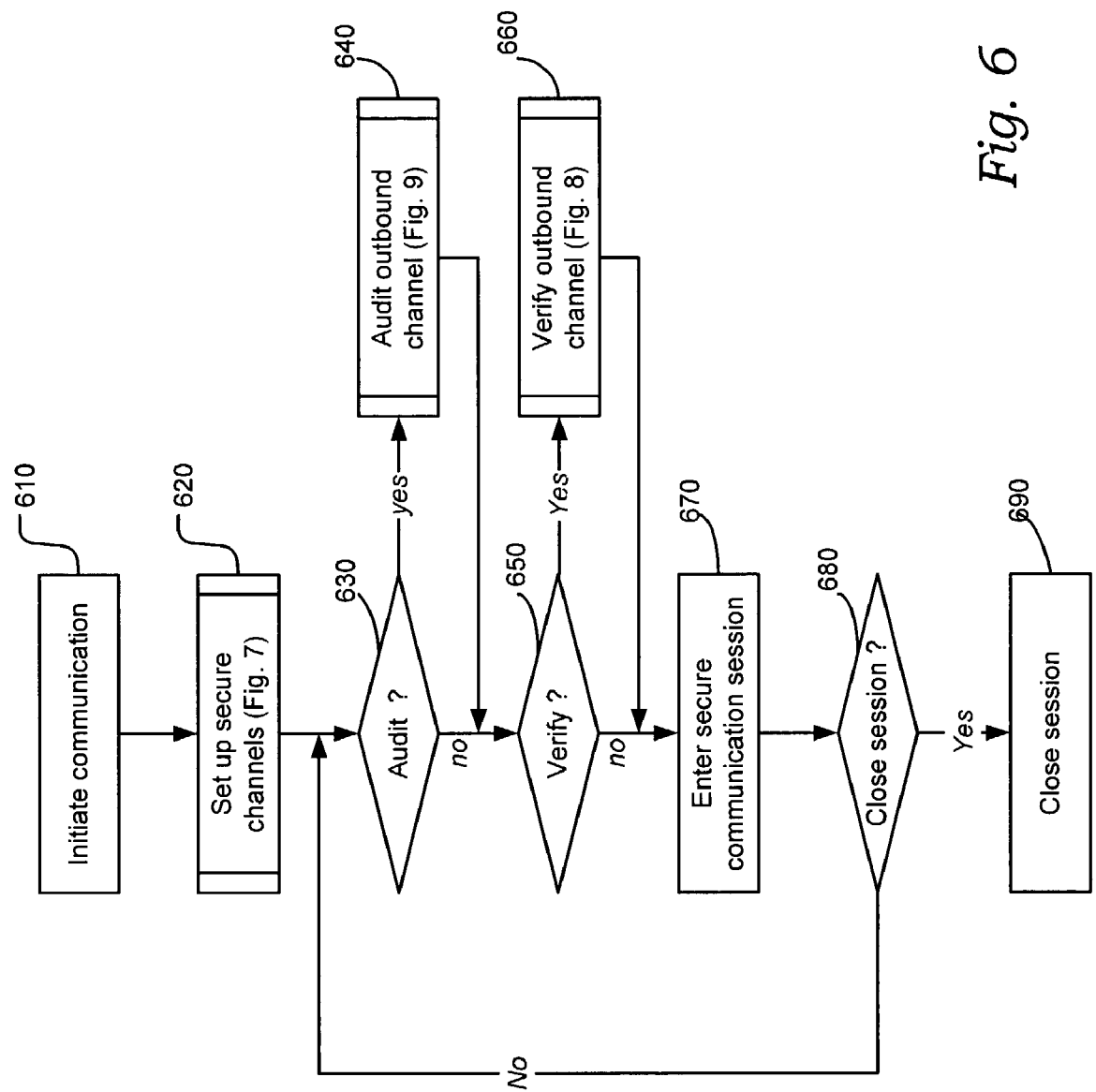
FIG. 6 is a flowchart of an exemplary overall process of secure communications, according to embodiments of the present invention.

FIG. 6 is a flowchart of an exemplary overall process from creating to closing a communication session, according to embodiments of the present invention. The client 110 first initiates communication (at 610) using the protocol described above. Necessary channels are set up (at 620). This may include setting up the main channel 130 during the initial handshake and then setting up either the inbound channel or the outbound channel or both according to an appropriate routing metric. More details related to the initial set up are discussed below with reference to FIG. 7.

After the initial set up, the server 120 may determine (at 630) whether any audit needs to be performed before the outbound channel is to be used to transport data to the client 110. Such a need may arise when the outbound channel 150 is set up. If an audit is needed, the server 120 performs audit (at 640). Details about the audit are discussed below with reference to FIG. 9.

The client 110 may also determine (at 650) whether the outbound channel needs to be verified before it is used for data transport. Similarly, such a need may arise only when the outbound channel has actually been set up. If verification is needed, the client 110 performs channel verification at 660. Details with respect to the verification of the outbound channel 150 are described below with reference to FIG. 8.

When the quality of the outbound channel is verified, the two end points enter into a communication session (at 670). During the communication session according to this invention, either of the client 110 or the server 120 may repeat the quality check of the outbound channel 150 by re-performing verification or audit. The server 120 may re-initiate the audit the outbound channel 150 or the client 110 may re-initiate to verify the QoS of the outbound channel 150. When either end node decides to terminate or close the communication session (determined at 680), the close operation is performed (at 690).

Figure 7:
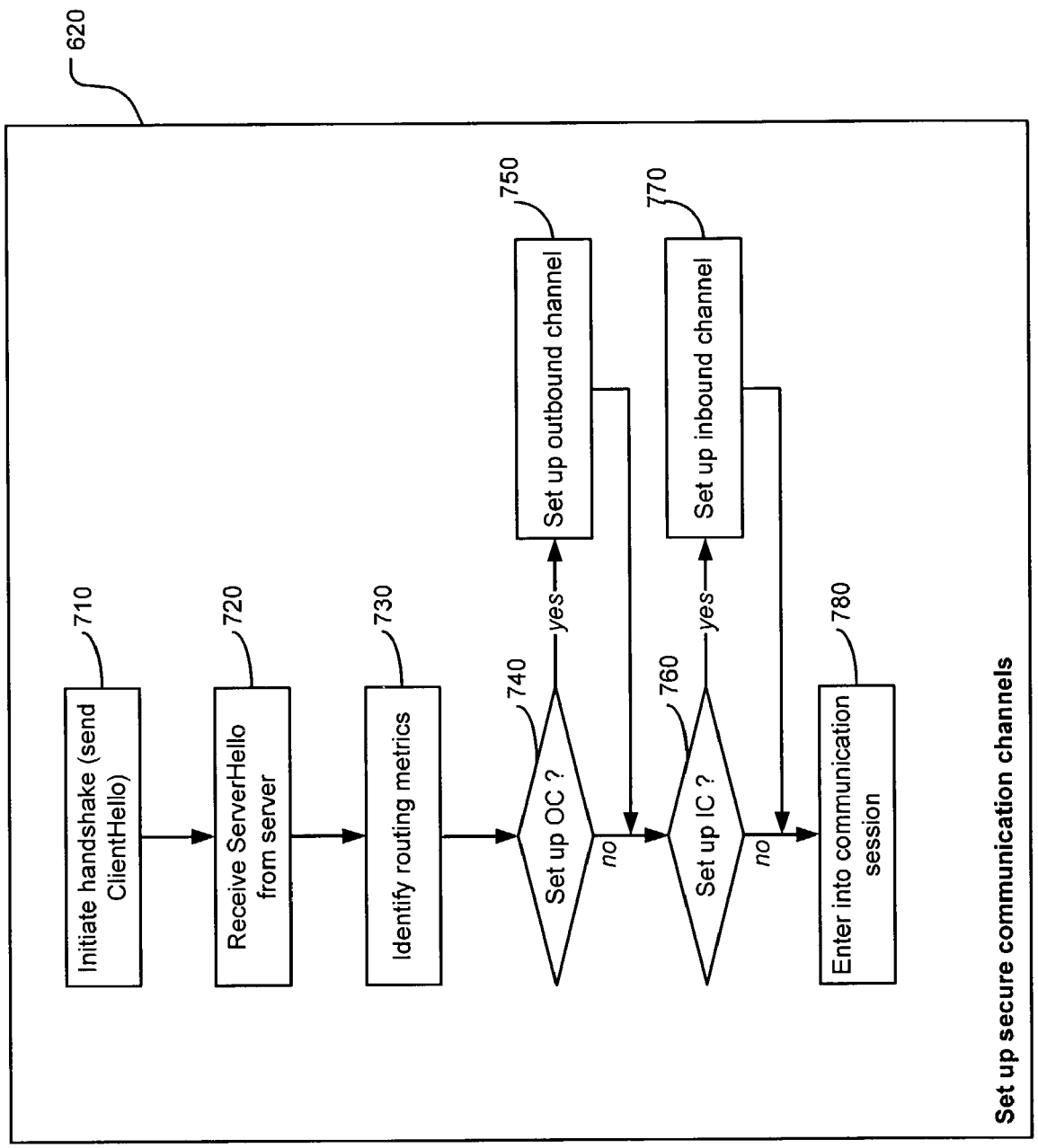
FIG. 7 is a flowchart of an exemplary process, in which a communication session is initiated and necessary communication channels are set up, according to embodiments of the present invention.

FIG. 7 is a flowchart of an exemplary process, in which a communication session is initiated and necessary channels are initially set up, according to embodiments of the present invention. The client 110 first initiates (at 710) a handshake for communication by sending a ClientHello message to the server 120. During the handshake, the main channel 130 is set up. The ClientHello message may contain an inbound routing metric specifying the routing parameters related to the inbound channel to be set up. The server 120, after negotiating the terms that may be set forth in the ClientHello message, constructs and sends a ServerHello message back to the client 110. The ServerHello message may contain both negotiated inbound routing metric and an outbound routing metric specifying the routing parameters about the outbound channel to be set up.

Upon receiving the ServerHello message (at 720), the client 110 identifies relevant routing metric. The client 110 determines (at 730) whether the ServerHello message contains an outbound routing metric or alternatively whether an outbound channel needs to be set up (at 740). If the answer is affirmative, the client 110 enters into the Set up-OC state to set up (at 750) the outbound channel according to the identified outbound routing metric. Details about setting up a channel are discussed further below with reference to FIG. 12.

The client 110 further determines (at 760) whether an inbound channel is to be set up. If so, the client 110 enters into the Set up-IC state to set up (at 770) the inbound channel according to the identified inbound routing metric. When necessary channels are set up, the client 110 and the server 120 (as well as all involved intermediaries) enter into a communication session (at 780).

Figure 8:
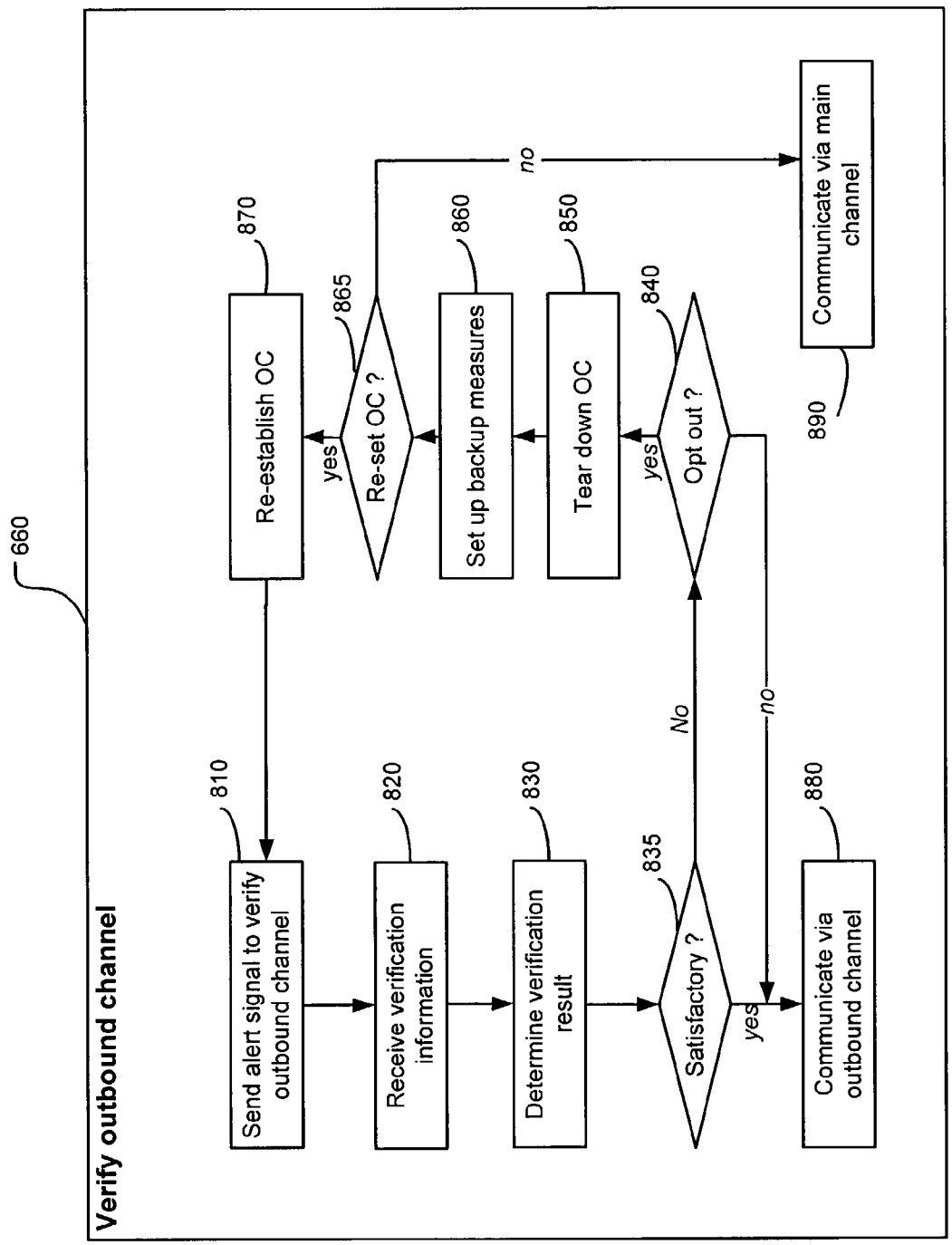
FIG. 8 is a flowchart of an exemplary process, in which a client verifies an outbound channel, according to embodiments of the present invention.

To use the outbound channel 150 for secure and quality communication, both the client 110 and the server 120 may assess the performance of the outbound channel, either on a regular basis or on occasional basis. The outbound channel 150 may be verified (by the client 110) or audited (by the server 120) either prior to or during its use (as discussed with reference to FIG. 6). FIG. 8 is a flowchart of an exemplary process in which the client 110 verifies the outbound channel 150, according to embodiments of the present invention. The client 110 first sends (at 810) an alert signal, via the main channel 130, to the server 120 indicating that verification is requested. At the same time, the client 110 may send data to the server 120.

Upon receiving the verification request from the client 110, the server 120 furthermore receives the data from the client 110 and sends the received data back to the client 110 via the outbound channel 150. Upon receiving the data from the server 120 (at 820), the client 110 may compare the original copy of the data sent with the returned data from the server 120 to determine (at 830) the QoS over the outbound channel 150. If the QoS of the outbound channel 150 is not satisfactory (determined at 835), the client 110 determines (at 840) whether to opt out of the outbound channel 150. If the outbound channel is to be opted out, the channel is torn down (at 850). After the outbound channel is torn down, certain backup measures may be set up (at 860). Such backup measures may include adopting a backup routing scheme such as utilizing an alternative channel (e.g., the main channel 130) for outbound data transport. It may also include determining an alternative routing policy over the alternative channel. In addition, it may need to inform interested parties of the fact that the outbound channel has been opted out. Furthermore, it may also need to decide alternative means to perform the data processing functions originally achieved by some of the intermediaries in the outbound channel such as language translation, virus scan, or text to speech transformation.

The client 110 may also determine (at 865) whether the outbound channel needs to be re-established. If the outbound channel 150 needs to be re-established, the process proceeds to re-set a new outbound channel (at 870). Details of re-establishing a channel will be discussed below with reference to FIG. 10. When the outbound channel performs satisfactorily (at 835) or when the outbound channel is not opted out (determined at 840 even when it is not satisfactory), the outbound channel 150 is used (880) for secure communication. When the torn down outbound channel is not re-established (determined at 865), the secure communication may be performed based on the backup measures set (at 860). For example, the backup measures may set that in case that the torn down channel is not to be re-established, the secure communication may be performed via the main channel (at 890).

Figure 9:
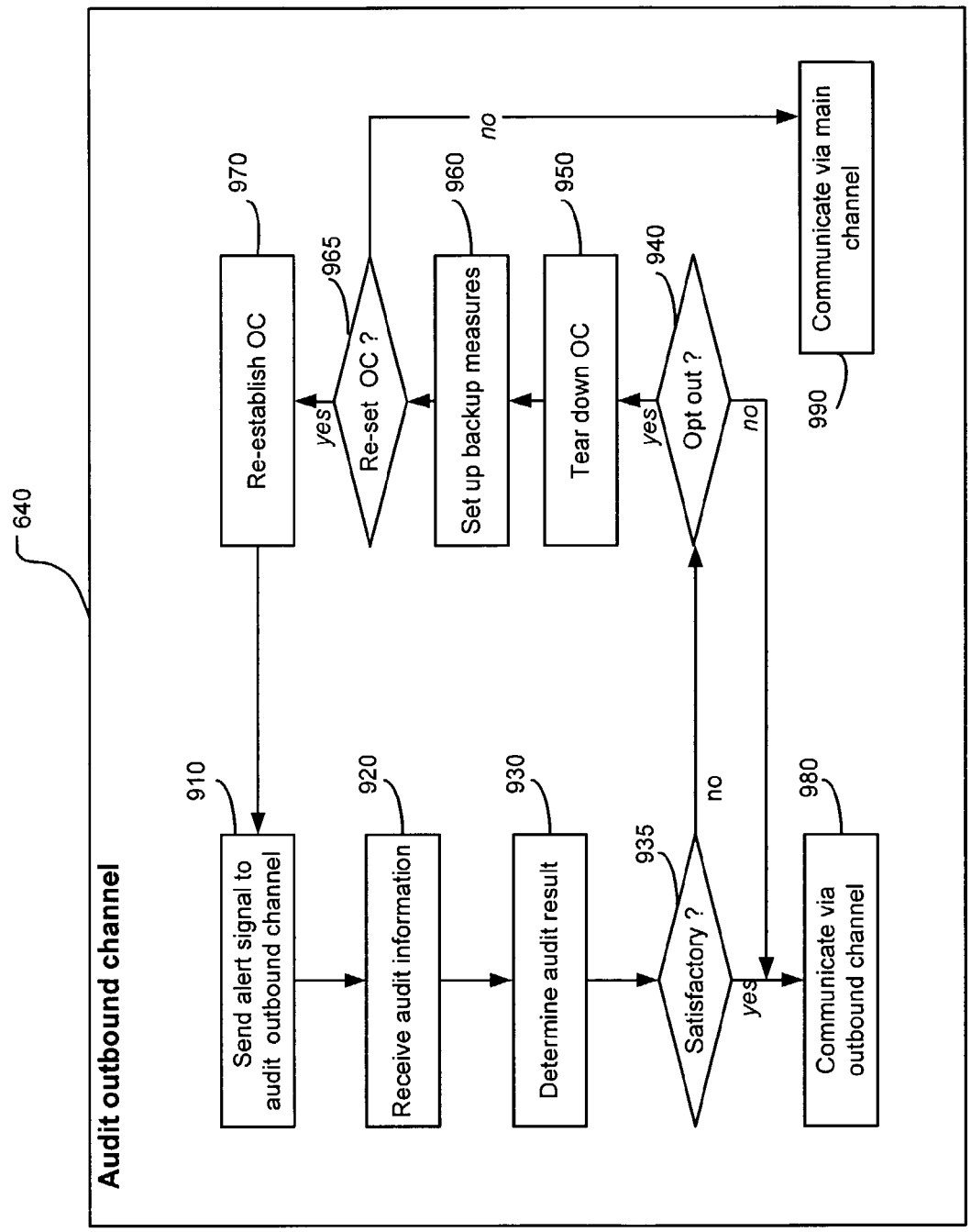
FIG. 9 is a flowchart of an exemplary process, in which a server audits an outbound channel, according to embodiments of the present invention.

The outbound channel 150 may also be audited by the server 120 either prior to or during its use (as discussed with reference to FIG. 6). FIG. 9 is a flowchart of an exemplary process in which the server 120 audits the outbound channel 150, according to embodiments of the present invention. The server 120 first sends (at 910) an alert signal, via the main channel 130, to the client 110 indicating that audit is requested. At the same time, the server 120 may send data to the client 110 via the outbound channel for audit purposes.

Upon receiving the audit request from the server 120, the client 110 furthermore receives the data from the server 120 via the outbound channel 150 and sends the received data back to the server 120 via the main channel 130. Upon receiving the data from the client 110 (at 920), the server 120 may compare the original copy of the data sent with the returned data from the client 110 to determine (at 930) the performance of the outbound channel 150. If the performance of the outbound channel 150 is not satisfactory (determined at 935), the server 120 determines (at 940) whether the server should opt out of the outbound channel 150. If the decision is yes, then the outbound channel 150 is torn down (at 950). After the outbound channel is torn down, certain backup measures may be set up (at 960) as discussed earlier.

The server 120 may also determine (at 965) whether the outbound channel needs to be re-established. If the outbound channel 150 needs to be re-established, the process proceeds to re-set a new outbound channel (at 970). Details of re-establishing a channel will be discussed below with reference to FIG. 10. When the outbound channel performs satisfactorily (determined at 935) or when the outbound channel is not opted out (determined at 940 even when it is not satisfactory), the outbound channel 150 is used (980) for secure communication. When the torn down outbound channel is not re-established (determined at 965), the secure communication may be performed (at 990) via the main channel.

An existing channel (both inbound and outbound) may be re-set up. This may be triggered by different reasons. For example, as discussed with reference to FIG. 8 and FIG. 9, when the outbound channel 150 does not perform to meet requirements, it may be re-established. There may be other reasons to re-set up a channel. For instance, a particular channel may be released for other purposes. For example, a lower priority communication session may yield a high quality channel to a higher priority Communication session according to this invention.

Figure 10:
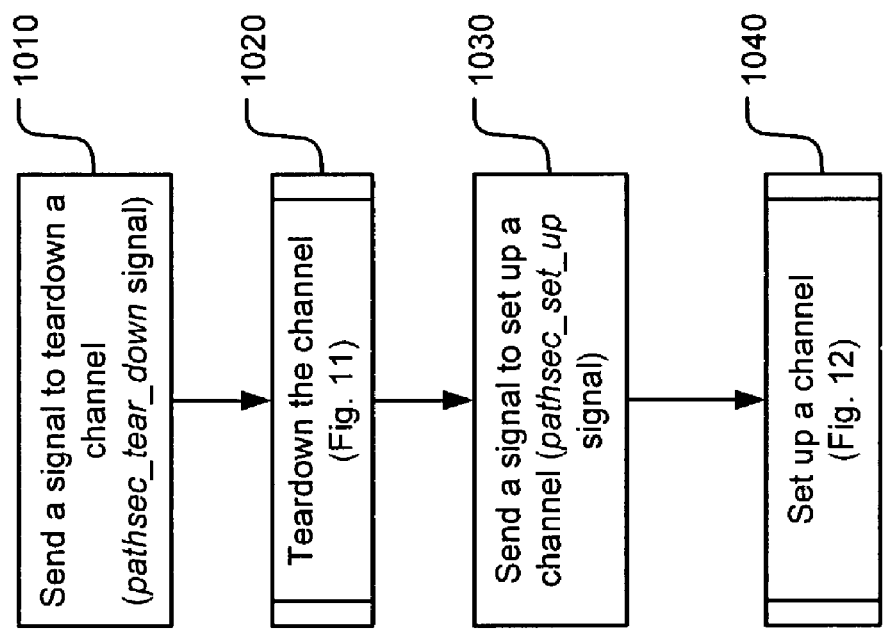
FIG. 10 is a flowchart of an exemplary process, which re-establishes a communication channel, according to embodiments of the present invention.

To re-establish a channel, the existing channel may need to be torn down prior to setting up a new one. FIG. 10 is a flowchart of an exemplary process, which re-establishes an existing channel, according to embodiments of the present invention. The channel that is to be replaced with a new channel is torn down (at 1010 and 1020) prior to re-setting up a replacement channel (at 1030 and 1040). To tear down a channel, a signal indicating to tear down a channel is first sent (at 1010). Upon receiving the tear-down signal, the channel is torn down (at 1020). This may be done by propagating the signal along the entire path, hop-by-hop, of the channel that is to be torn down. At each hop, the starting node of the hop is released. When the signal reaches the end of the path, the entire channel is torn down, as discussed in detail with reference to FIG. 11.

To re-establish a new (replacement) channel, a signal indicating a desire to set up a channel (e.g., pathsec_signal_set_up_ic or pathsec_signal_set_up_oc) is sent (at 1030) and it contains the routing metric relevant to the new channel. The new channel is set up (at 1040) based on the routing metric contained in the channel set-up signal. Specifically, to set up the new channel based on the routing metric contained in the channel set-up signal, the routing metric travels, hop-by-hop, along the entire path, as discussed in detail with reference to FIG. 12.

Figure 11:
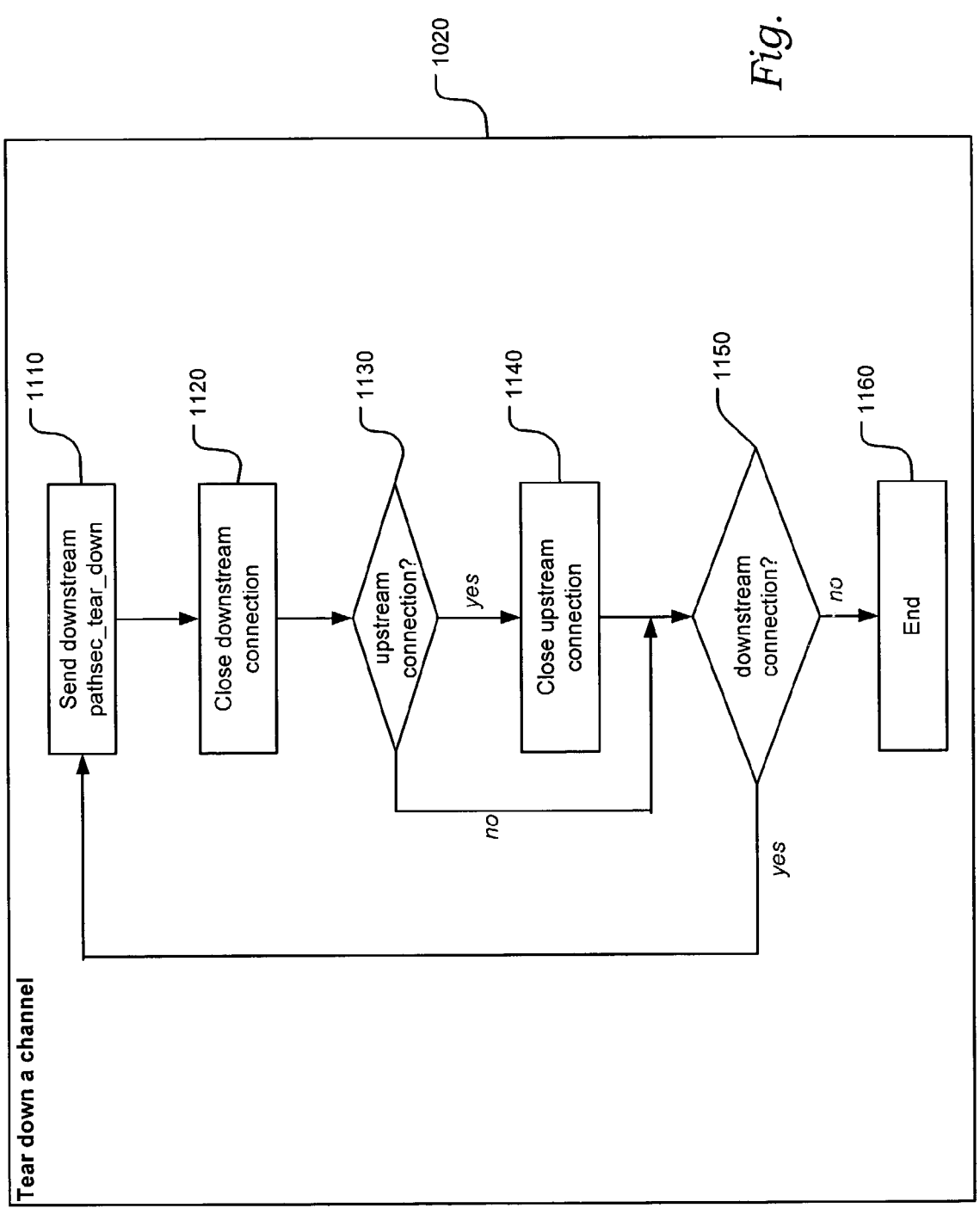
FIG. 11 is a detailed flowchart of an exemplary process of tearing down a communication channel, according to embodiments of the present invention.

FIG. 11 is a detailed flowchart of the exemplary process (1020, FIG. 10) of tearing down a channel, according to embodiments of the present invention. In this illustrated embodiment, a channel is torn down hop-by-hop. Other schemes of tearing down a channel may also be realized. A tear-down operation may be triggered by sending, from the client 110, a pathsec_tear_down signal to the first node of the channel to be torn down. For example, to tear down the outbound channel 150, a pathsec_tear_down_oc signal may be sent as an alert signal from the client 110 toward the server 120 via the outbound channel 150. Similarly, to tear down the inbound channel 140, a pathsec_tear_down_ic signal may be sent as an alert signal from the client 110 toward the server 120 via the inbound channel.

Once a hop-by-hop tear-down operation is initiated, the operation may be performed recursively until all the hops are closed. In tearing down a channel, all nodes, except for the last node, in the inbound or outbound channel receiving a pathsec_tear_down_ic or pathsec_tear_down_oc, respectively, may propagate the received signal downstream (at 1110) and then proceed to close down its downstream and upstream connections. If there is an upstream connection (determined at 1130), the upstream connection is closed (at 1140). If there is a downstream connection, the tear-down operation proceeds in a recursive manner by returning to act 1110. The last node, which is either the client 110 or the server 120, having no downstream neighbor, may simply close its upstream connection without propagating the tear-down signal any further.

After closing down their upstream/downstream connections, per pathsec_tear_down_ic or pathsec_tear_down_oc, the client 110 or the server 120 may signal themselves with either a pathsec_ic_torn_down or pathsec_oc_torn_down signal, as appropriate.

Figure 12:
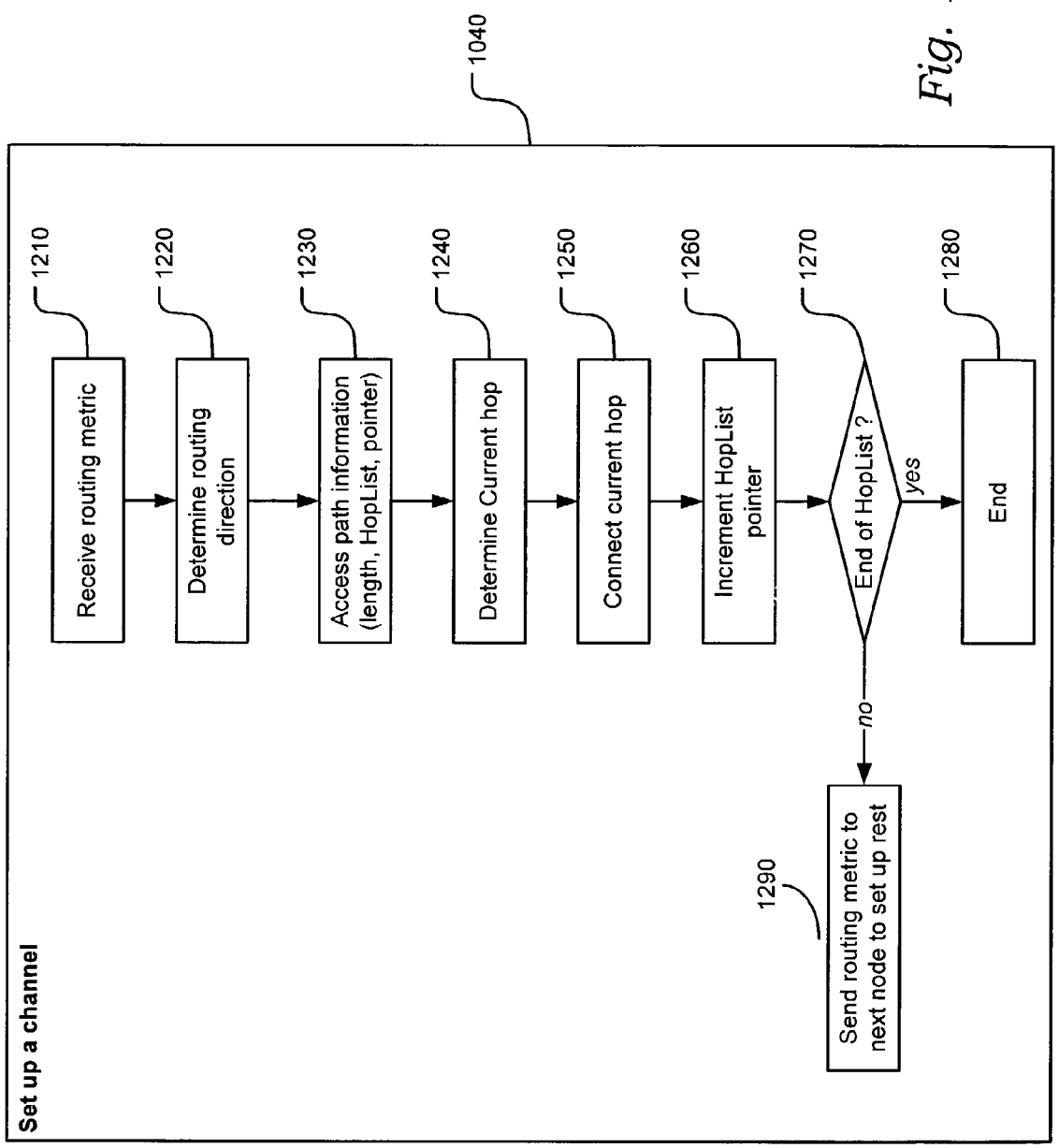
FIG. 12 describes a flowchart of an exemplary generic process to set up a communication channel, according to embodiments of the present invention.

At different stages of a communication session according to embodiments of this invention (for example, at the initial set up stage), either the client 110 or the server 120 may request to set up a particular channel. A new channel may also be requested during an established communication session. Yet another possibility is a request to set up a new channel (e.g., outbound channel) after a similar channel (e.g., outbound channel) has just been torn down. FIG. 12 describes a flowchart of an exemplary generic process to set up a channel, according to embodiments of the present invention.

Setting up a channel may be performed hop-by-hop in a recursive fashion. In this mode, once a hop-by-hop channel set-up operation is initiated, the operation may be performed recursively until all the hops are set up. Alternatively, a channel may also be established using a different set-up scheme. A channel set-up operation may be triggered by sending, from the client 110, a pathsec_set_up signal to the first node of the channel to be set up. For example, to set up the outbound channel 150, a pathsec_set_up_oc signal may be sent as an alert signal from the client 110 toward the server 120. Similarly, to set up the inbound channel 140, a pathsec_set_up_ic signal may be sent as an alert signal from the client 110 toward the server 120.

When a hop-by-hop scheme is employed, a routing metric may be carried hop-by-hop in a pathsec_set_up signal and each hop is established individually and sequentially along the channel in the direction from the client 110 to the server 120. To set up a hop, relevant routing metric with a pathsec_set_up signal is first received at a node (at 1210) along the channel. For example, an inbound routing metric may be received along with a pathsec_set up_ic signal. Similarly, when the outbound channel is to be set up, an outbound routing metric may be received along with a pathsec_set up_oc signal.

From the routing metric, a node that receives the pathsec_set_up signal may determine (at 1220) the routing direction along the channel as well as various routing parameters that are useful to the set-up operation. It may also access (at 1230) other relevant information such as the length of the path and a hop list pointer.

The current hop that is to be set up is determined (at 1240), e.g., based on the hop list pointer. This may be done by identifying the hop from the hop list contained in the routing metric via the current value of the hop list pointer. The current hop is then set up (at 1250) by connecting the source node of the hop with the destination node of the hop.

To facilitate the recursive set-up operation, certain information in the routing metric is dynamically updated. For example, the hop list pointer may need to be incremented (by one) (at 1260) at each recursion. The value of such updated pointer may be updated at each hop so that it can be used to compare with the length of the hop list to determine (at 1270) whether all the hops along the channel have been set up. If there is no remaining hop to set up, the channel set-up operation is terminated (at 1280). Otherwise, the set-up operation is invoked recursively by sending (at 1290) the updated routing metric onto the next node.

Figure 13:
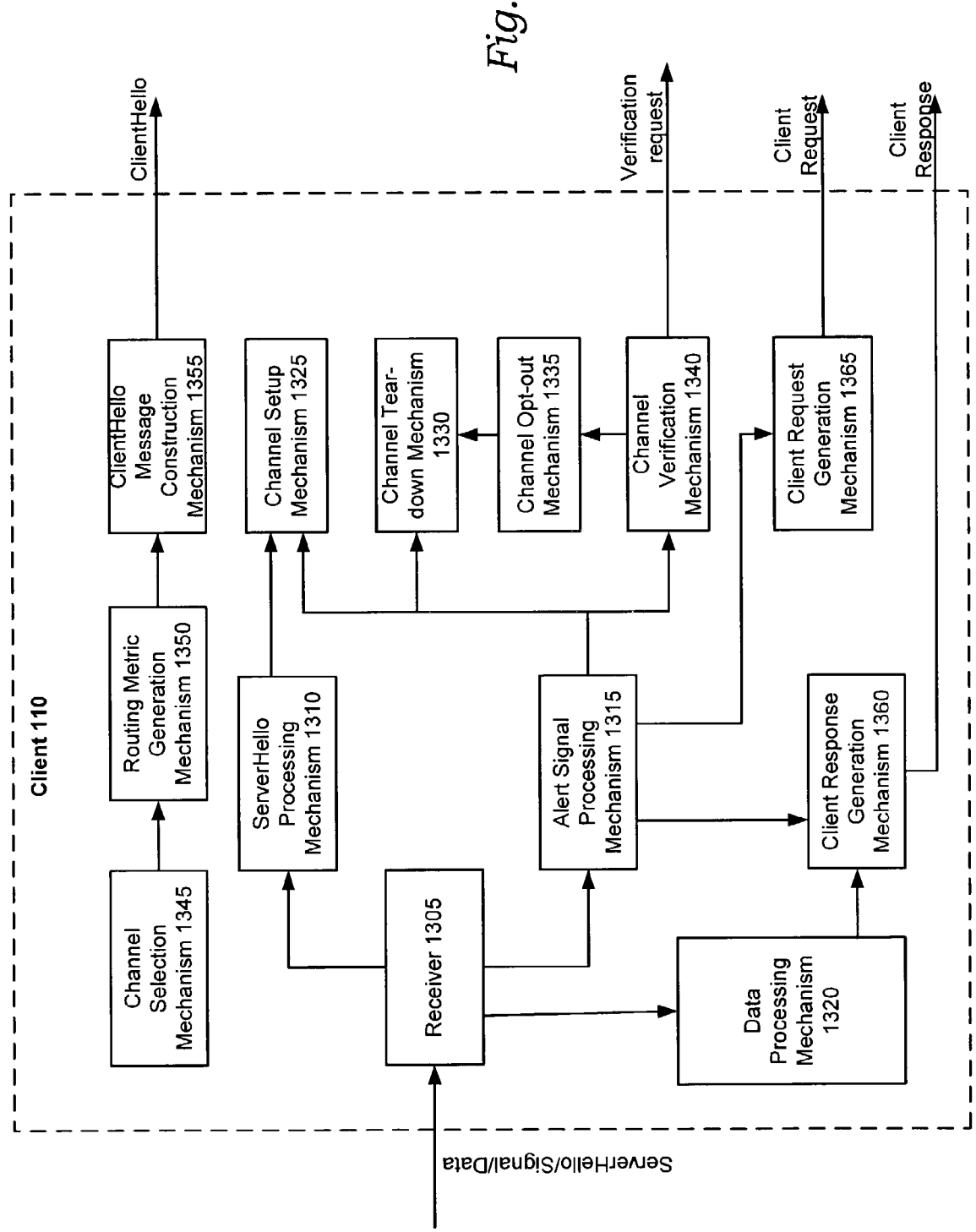
FIG. 13 depicts the high level functional block diagram of a client, according to embodiments of the present invention.

To support the so far described secure communication, the client 110 and the server 120 may be equipped to facilitate various required operations. FIG. 13 depicts the internal functional block diagram of the client 110, according to embodiments of the present invention. A receiver 1305 is responsible, on the client side, for receiving information (e.g., messages, alert signals, or data) through one of the channels connected to the server 120 directly via intermediaries. Depending on the type of received data, it may be processed by one of three processing mechanisms: a ServerHello processing mechanism 1310 to analyze a ServerHello message, an alert signal processing mechanism 1315 to analyze an alert signal, and a data processing mechanism 1320 to process communication data.

Channel set-up procedures may be initiated from the client 110. To facilitate that, the client 110 includes a channel set-up mechanism 1325 that initiates a channel set-up procedure. The procedures may be initiated based on a routing metric. The client 110 also includes a channel tear-down mechanism 1330. In addition, the client 110 includes a channel verification mechanism 1340 that performs verification of the outbound channel 150. To do so, it may issue a verification request to the server 120. With the request, it may also send a piece of verification data to the server via the main channel 130. Upon receiving a copy of the verification data sent back from the server 120 via the outbound channel (e.g., via the receiver 1305 and forwarded to the channel verification mechanism 1340), it then determines the quality of the outbound channel.

When the performance of the outbound channel is not satisfactory, the channel verification mechanism 1340 may invoke a channel opt out mechanism 1335 to opt out of the outbound channel. The channel opt-out mechanism 1335 may execute an opt-out procedure to achieve that. For example, it may invoke the channel tear-down mechanism 1330 to tear down the outbound channel and it may also implement backup measures to compensate. Such backup measures may include adopting a backup routing scheme such as utilizing an alternative channel (e.g., the main channel 130) for outbound data transport. It may also include determining an alternative routing policy over the alternative channel. In addition, it may need to inform interested parties of the fact that the outbound channel has been opted out. Furthermore, it may also need to decide alternative means to perform the data processing functions originally achieved by some of the intermediaries in the outbound channel such as, for example, language translation, virus scan, or text-to-speech transformation.

The client 110 may be also capable of determining an inbound/outbound channel comprising zero or more intermediaries selected based on requirements of inbound/outbound data. A channel selection mechanism 1345 may be responsible for selecting the intermediaries of a channel. Based on the selected intermediaries of an inbound/outbound channel, a routing metric generation mechanism 1350 may determine the routing parameters associated with the channel and generate a routing metric. Information about the channel and its relevant routing parameters are then used to construct, by a ClientHello message construction mechanism 1355, a hello message (e.g., a ClientHello message). The client hello message is then sent to the server 120.

The client 110 may also include a client response generation mechanism 1360 that generates a response based on either data processing result or the content of an alert signal. Examples of such a response include an echo requested by the server 120 (e.g., through an alert signal). For instance, the server 120 may perform authentication and send an authentication request to the client 110. In this case, the server 120 may send a ping signal with an authentication request and demand the client 110 to echo the ping signal through, for example, the outbound channel. Upon receiving the authentication request, the client request generation mechanism 1365 may then echo the ping signal via the indicated outbound channel to the server 120. The server 120 may then compare the original ping signal and the received echo signal to determine the authenticity of the outbound channel.

In certain situations, the client 110 may also generate a client request, by a client request generation mechanism

1365, and sends such a request to the server 120. Examples of such requests include a request for certain data or a request to close the underlying communication session according to this invention.

Figure 14:
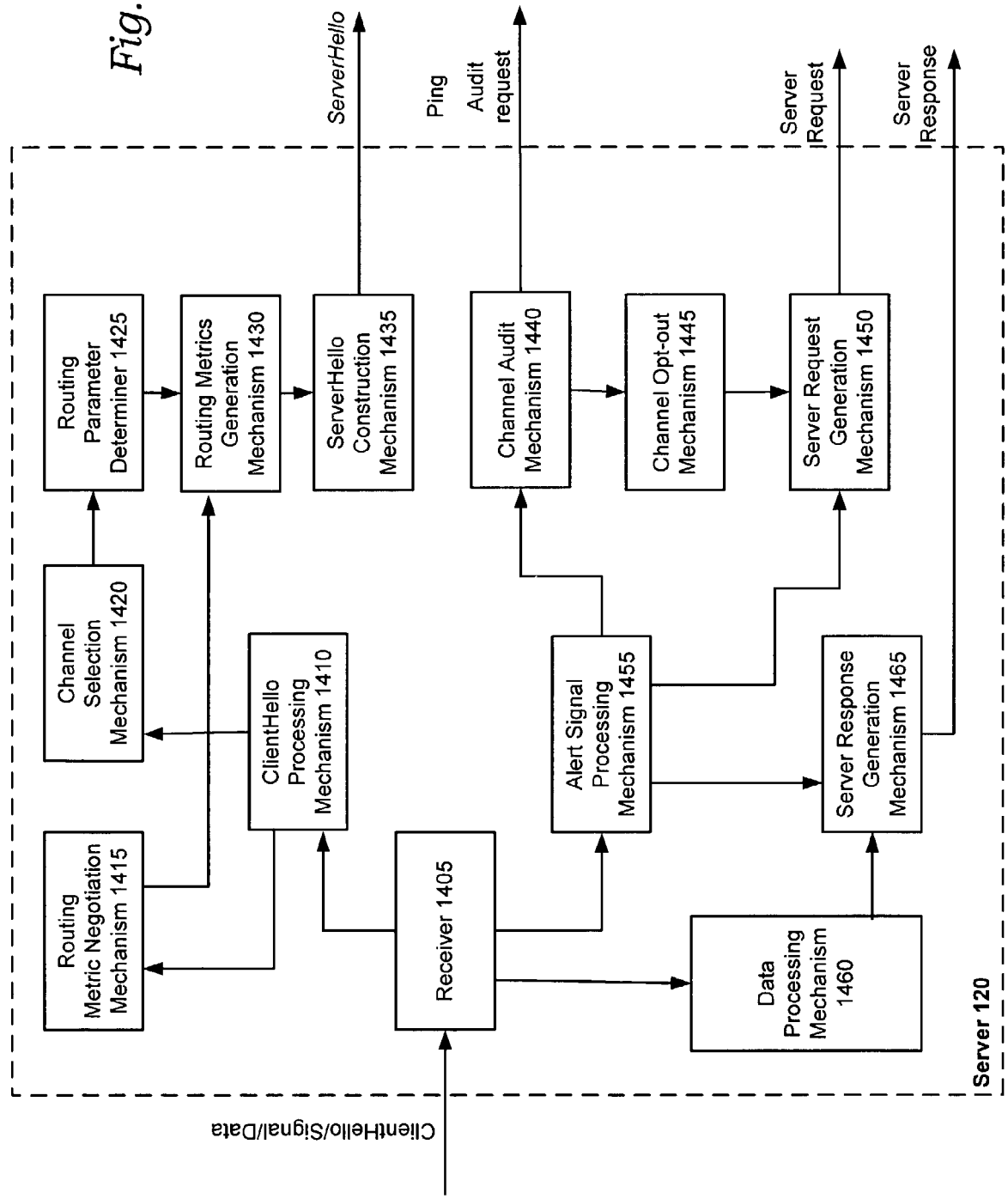
FIG. 14 depicts the high level functional block diagram of a server, according to embodiments of the present invention.

To support a communication session according to this invention, the server 120 may also be designed to facilitate so far discussed exemplary server functionalities. FIG. 14 depicts the internal functional block diagram of the server 120, according to embodiments of the present invention. A receiver 1405 on the server side is responsible for receiving information (including messages, alert signal, and data) from one of the channels connected to the client 110 via intermediaries. Depending on the type of received information, it may be processed by one of three processing mechanisms: a ClientHello processing mechanism 1410 that analyzes a ClientHello message, an alert signal processing mechanism 1455 to analyze an alert signal, and a data processing mechanism 1460 to process communication data.

Upon receiving a ClientHello message, the server 120 responds with a ServerHello message to complete the handshake. As discussed earlier, the ServerHello message may include information such as a negotiated inbound routing metric (i.e., if the client 110 includes an inbound routing metric in the ClientHello message) and an outbound routing metric (if the server 120 chooses to set up an outbound channel). A routing metric negotiation mechanism 1415 is responsible for generating negotiated inbound and/or outbound routing metrics based on received information. At the same time, a channel selection mechanism 1420 may be responsible for determining an inbound/outbound channel, including its intermediaries, according to requirements of the underlying communication session according to this invention. Based on the selected intermediaries of a channel, a routing parameter determiner 1425 determines necessary routing parameters associated with the channel.

Upon receiving the negotiated inbound/outbound routing metric from the routing metric negotiation mechanism 1415 and the routing parameters from the routing parameter determiner 1425, a routing metrics generation mechanism 1430 creates corresponding routing metric, which will be subsequently used by a ServerHello construction mechanism 1435 to produce a ServerHello message to be sent to the client 110.

The server 120 also includes a channel audit mechanism 1440 that audits the outbound channel 150. To do so, it may issue an audit request to the client 110. With the request, it may also send a piece of audit data, say A, to the client via the outbound channel 150 where the data undergoes transformation performed by the intermediaries in the outbound channel 150, resulting in A'. Upon receiving a copy of A' sent back from the client 110 via the main channel 130 (e.g., via the receiver 1405 and forwarded to the channel audit mechanism 1440), it then determines the quality of the outbound channel.

When the performance of the outbound channel is not satisfactory, the channel audit mechanism 1440 may invoke a channel opt out mechanism 1445 to opt out of the outbound channel 150. The channel opt-out mechanism 1445 may execute an opt-out procedure to achieve the requested opt-out. For example, it may issue an alert signal with a pathsec_tear_down_oc request via a server request generation mechanism 1450 to ask the client 110 to tear down the outbound channel 150. The channel opt out mechanism 1445 may also implement backup measures as discussed before in the situation of opting—out of the outbound channel by the client 110.

The server request generation mechanism 1450 issues server requests. For instance, upon the establishment of the outbound channel 150, the server 120 may perform authentication prior to the use of the outbound channel. In this case, the server 120 may invoke, upon receiving a signal indicating that the outbound channel has been set up, the server request generation mechanism 1450 to issue an authentication request to the client 110.

The server request generation mechanism 1450 may send the authentication request with a ping signal and demand the client 110 to echo the ping signal via a designated channel (e.g., the channel to be authenticated such as the outbound channel) back to the server 120. The server 120 may then wait until receiving the echo signal from the client 110. Upon receiving the echo signal, the server 120 may invoke the data processing mechanism 1460 to analyze whether the outbound channel (including all the outbound intermediaries) is authentic.

Similar to the client 110, the server 120 may also include a server response generation mechanism 1465 that generates a response based on either data processing result or the content of a received alert signal. For example, after the server 120 authenticated the outbound channel 150, the server response generation mechanism 1465 may issue a response sent to the client 110 indicating that the outbound channel has been authenticated.

Figure 15:
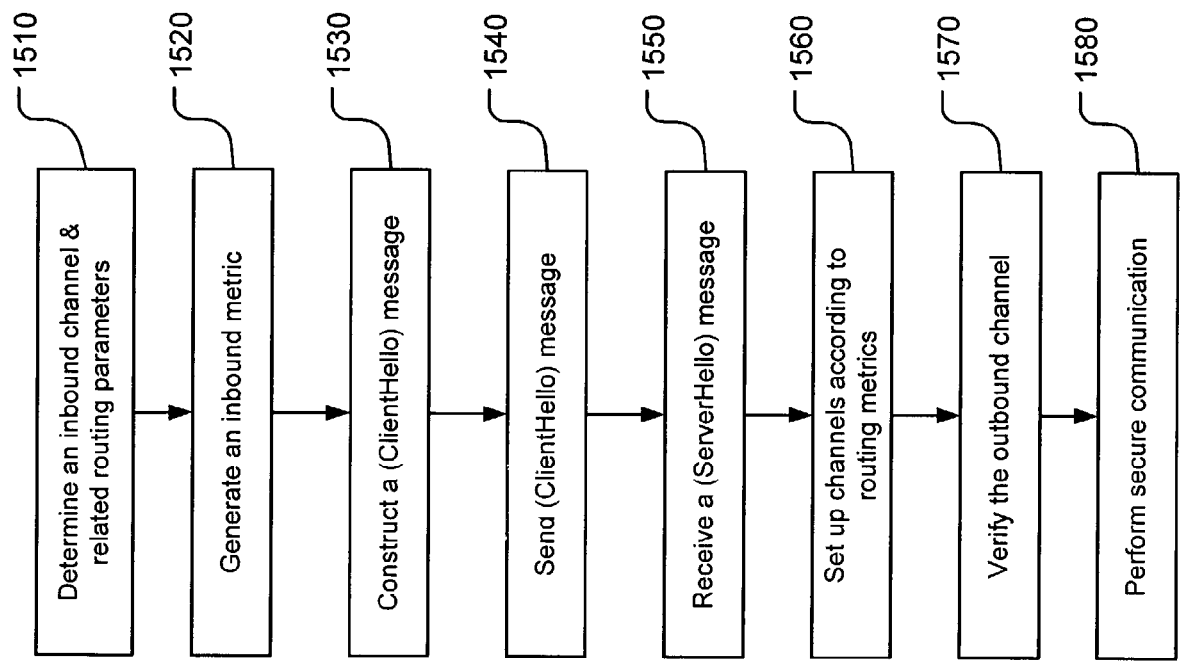
FIG. 15 is a flowchart of an exemplary process of a client, according to embodiments of the present invention.

FIG. 15 is a flowchart of an exemplary process of the client 110, according to an embodiment of the present invention. An inbound channel and its relevant inbound routing parameters are first determined (at 1510). Based on the selected inbound channel and the inbound routing parameters, an inbound routing metric is generated (at 1520). To initiate a communication session with the server 120, the client 110 constructs a ClientHello message and sends it to the server 120 (at 1530 and 1540, respectively). The client 110 then waits for a response from the server 120.

Upon receiving (at 1550) a ServerHello message from the server 120, the client 110 sets up (at 1560) selected channels, inbound and/or outbound, according to the routing metrics (received with the ServerHello message). If and after the outbound channel 150 is set up, the client 110 may initiate (at 1570) to verify the established outbound channel 150 prior to entering into the communication session for secure communication (at 1580).

Figure 16:
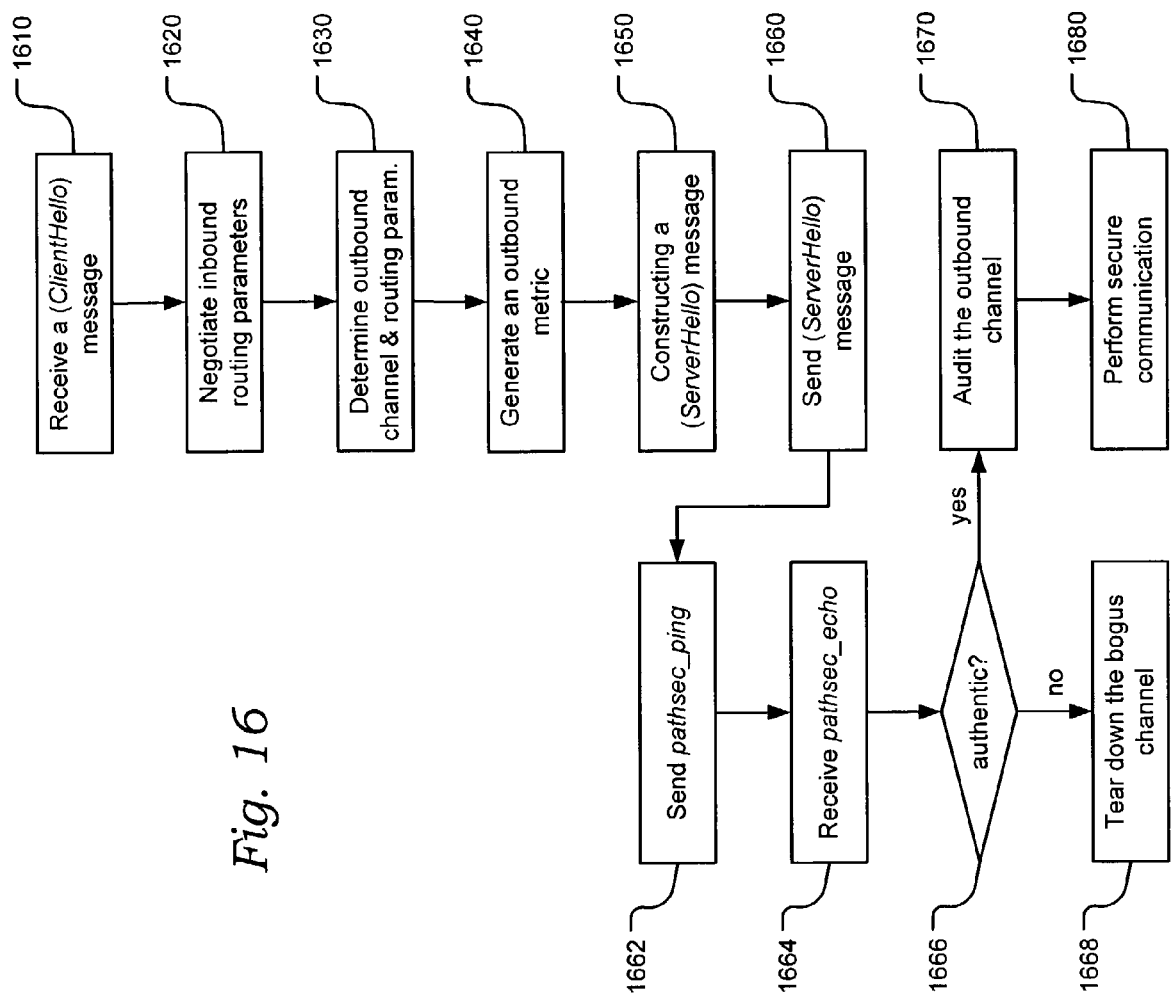
FIG. 16 is a flowchart of an exemplary process of a server, according to embodiments of the present invention.

FIG. 16 is a flowchart of an exemplary process of the server 120, according to an embodiment of the present invention. A ClientHello message is first received (at 1610). If an inbound routing metric is specified (in the ClientHello message), the server 120 may examine the routing parameters in the inbound routing metric and negotiate (at 1620) different terms. This may produce a negotiated inbound routing metric.

To establish an outbound channel, the server 120 determines (at 1630) the intermediaries of the outbound channel as well as relevant routing parameters associated with the selected outbound channel. Using the selected outbound channel and the outbound routing parameters, an outbound routing metric is accordingly generated (at 1640).

Based on both the negotiated inbound routing metric and the outbound routing metric, the server 120 constructs (at 1650) a ServerHello message and sends (at 1660) the message to the client 110. The server 120 may then wait until the selected channels (i.e., inbound channel 140 or the outbound channel 150 or both) are set up. To authenticate an established channel (e.g., the inbound or outbound channel), the server 120 may ping (at 1662) the client 110 via the main channel 130 and indicate to the client 110 a designated channel to be authenticated. The server 120 may then listen until receiving (at 1664) an echo in the designated channel, as described above with respect to the pathsec_ping and pathsec_echo signals. The received echo is used to authenticate (at 1666) the designated channel. If authentication fails, the channel in question may be torn down (at 1668).

To assess the performance of the outbound channel, if any, the server 120 may initiate to audit the outbound channel (at 1670) before it starts to perform secure communication with the client 110 (at 1680).

EXAMPLES

As discussed earlier, intermediaries, including both inbound and outbound intermediaries, may be selected based on the need of particular applications. For example, a particular communication session may involve a client who conducts communication in French and a server that provides Internet documents in English. In this case, information from the client (in French) may need to be translated from French into English before such information reaches the server. On the other hand, after the server retrieves requested documents (in English), the documents may be required to be translated into French before it arrives at the client. Although the client and the server may be equipped to perform the translation, suitable intermediaries may be used to carry out the translation tasks. In this way, the processing is distributed so that the client and the server are less likely to become potential bottleneck.

In some embodiments, intermediaries could include mechanisms that perform language translation, virus scan, conversion between text and speech, or document transformation. For example, language translation could be between English and French, English and Spanish, or English and Japanese. Conversion between text and speech may be necessary when a client requests, for example document information (in textual form), on a cellular phone that does not support the means to display text. In this case, the requested text retrieved by the server may be sent to an outbound intermediary that converts the text into speech signal before forwarding the speech information to the client's cellular phone. Conversely, the client may make request via speech and such speech may need to be translated into textual form, for example, via automatic speech recognition, before the request can be processed by the server.

Furthermore, document information may be coded in different forms. For example, some Internet document may be coded in HTML, some in XML, and some in WML. A client may require a document in WML but the server may have the document that is in XML. In this case, an outbound intermediary may be designated to perform a transformation between XML and WML. Document transformation includes, but is not limited to, transformation between HTML and XML; HTML and HDML; HTML and WML; XML and HDML; and between XML and WML.

An intermediary may be selected because it is capable of performing some required functionality. A required functionality may be performed using an off-the-shelf product. For example, an intermediary may be equipped with software for virus scanning. Intermediaries may also perform required processing using proprietary mechanisms.

The processing described above may be performed by a properly programmed general-purpose computer alone or in connection with a special purpose computer. Such processing may be performed by a single platform or by a distributed processing platform. In addition, such processing and functionality can be implemented in the form of special purpose hardware or in the form of software or firmware being run by a general-purpose or network processor. Data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

While described with reference to a generic client and server, in preferred embodiments the client, server, and intermediaries are computers in the Internet. While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

What is claimed is:

1. A method comprising:

initiating a communication session between a client and a server; and setting up at least one communication channel between the client and the server through which the client and the server send each other information via one or more intermediary nodes, at least one of said intermediary nodes selected by the client or by the server to process the information passing through it by performing a predefined function on said information, wherein the at least one communication channel includes (i) a main channel between the client and the server, and (ii) an inbound channel, having one or more inbound intermediary nodes selected by the client, and (iii) an outbound channel having one or more outbound intermediary nodes selected by the server, at least one of the more inbound intermediary nodes being identifiable in an inbound routing metric having inbound routing parameters; and at least one of the outbound intermediary nodes is identifiable in an outbound routing metric having outbound routing parameters; and the routing parameters comprising: a routing direction that defines a direction in which information travels within a channel; communication path related information; and a routing policy; wherein the routing policy includes at least one of: a strict source routing policy under which an intermediary node is not allowed to insert its own intermediary node into the communication path agreed by the server; and a loose source routing policy under which an intermediary node is allowed to insert its own intermediary node into the communication path previously agreed by the server;

wherein the server negotiates with the client on at least one intermediary node selected by the client, and wherein the processing performed on the information by at least one of said intermediary nodes is selected from the group comprising (i) security checking, (ii) language translation from a first language to a second language, and (iii) document transformation.

2. The method according to claim 1, wherein the routing parameters comprise communication path related information includes at least one of:
   a length of the communication path measured by the number of hops in the path;
   a hop list identifying the nodes that comprise the communication path,
   a hop list pointer pointing at one of the nodes in the hop list, and
   an indication of one or more authorized nodes that are allowed to modify the hop list.

3. The method according to claim 1, wherein the routing parameters comprise communication path related information including an indication one or more authorized nodes that are allowed to modify a hop list, and wherein the authorized nodes include one or more of:
   the server;
   the client;
   at least one intermediary node in the inbound channel; and
   at least one intermediary node in the outbound channel.

4. The method according to claim 1, wherein the routing parameters further include at least one of:
   a channel ticket used for key establishment between the client and the server; and
   an indicator of whether a master secret is to be shared by different hops.

5. The method according to claim 1, wherein the processing performed on the information by at least one of said intermediary nodes is language translation selected from the group comprising:
   English to French translation;
   English to Spanish translation; and
   English to Japanese translation.

6. The method according to claim 1, wherein the processing performed on the information by at least one of said intermediary nodes includes at least one of:
   text to speech conversion; and
   speech to text conversion.

7. The method according to claim 1, wherein the processing performed on the information by at least one of said intermediary nodes is document transformation selected from the group comprising:
   transforming a hypertext markup language document into an extensible markup language document;
   transforming a hypertext markup language document into a handheld device markup language document;
   transforming a hypertext markup language document into a wireless markup language document;
   transforming an extensible markup language document into a handheld device markup language document; and
   transforming an extensible markup language document into a wireless markup language document.

8. A method comprising:
   initiating a communication session between a client and a server; and
   setting up at least one communication channel between the client and the server through which the client and the server send each other information via one or more intermediary nodes, selected by the client or by the server to process the information, wherein the processing performed on the information by at least one of said intermediary nodes comprises security checking, and wherein said setting up at least one communication channel comprises:
   sending a client hello message from the client to the server via the main channel, the client hello message containing one or more routing metrics;
   receiving a server hello message sent from the server to the client via the main channel, the server hello message containing one or more routing metrics which the server generates either on its own initiative or based on negotiated outcome according to the routing metrics initiated by the client;
   setting up the outbound channel if an outbound routing metric is identified in the sever hello message; and
   setting up the inbound channel if an inbound outing metric is identified in the server hello message.

9. The method according to claim 8, further comprising:
   authenticating a designated channel that is set up via said setting up at least one communication channel; and
   auditing the outbound channel by the server to assess the quality of the outbound channel.

10. The method according to claim 9, wherein said authenticating a designated channel comprises:
    sending, by the server to the client, an authentication request via the main channel, the authentication request indicating the designated channel to the client;
    receiving, by the client, the authentication request;
    sending an echo generated based on thye authentication request from the client to the server via the designated channel;
    leaving by the server, the echo from the designated channel; and
    performing authentication of the designated channel based on the auhentication request and the echo.

11. The method according to claim 9, wherein said auditing the outbound channel comprises:
    sending an auditing request, said request including audit data, from the server to the client, via the outbound channel, wherein the audit data undergoes transformation performed by one or more intermediaries in the outbound channel, resulting in transformed audit data;
    receiving, by the client, the transformed audit data via the outbound channel;
    sending a copy of the transformed audit data from the client to the server via the main channel;
    receiving, by the server, the copy of the transformed audit data; and
    determining the performance of the outbound channel based on the audit data and the copy of the transformed audit data.

12. The method according to claim 11, further comprising:
    determining whether to opt out of the outbound channel when the performance is not satisfactory; and, based on said determining:
    tearing down the outbound channel; and
    establishing a new outbound channel.

13. The method according to claim 11, wherein
    the audit request is sent through as an alert signal; and
    the verification request is sent through as an alert signal.

14. The method according to claim 13, wherein the alert signal includes one or more of:
    an inbound channel set-up request;
    an outbound channel set-up request;
    an audit request;
    an audit response;

a verify request;
a verify response;
an outbound channel opt-out request;
a main channel tear-down request;
an inbound channel tear-down request;
an outbound channel tear-down request;
an all-channel tear-down request;
a ping request; and
an echo response.

15. The method according to claim 9, wherein said verifying the outbound channel comprises:
sending a verification request from the client to the server, via the main channel, with verification data attached to the verification request;
sending, by the server, a copy of the verification data received from the client, via the outbound channel wherein the verification data undergoes transformation performed by one or more intermediaries of the outbound channel, resulting in transformed verification data;
receiving, by the client, the transformed verification data via the outbound channel; and
determining the performance of the outbound channel based on the verification data and the transformed verification data.

16. The method according to claim 15, further comprising:
determining whether to opt out of the outbound channel when the performance is not satisfactory; and, based on said determining:
tearing down the outbound channel; and
establishing a new outbound channel.

17. A method for a server communicating with a client through at least one channel between the server and the client, the method comprising:
receiving a first message from the client via a main channel to establish communication with the client;
sending the client a second message, constructed based on the first message and requesting the client to set up said at least one channel with one or more intermediaries determined by the client or the server; and
communicating with the client through the at least one channel,
wherein at least one of said one or more intermediaries is selected by the client or the server to perform a predefined function on data passing through it, wherein said predefined function is selected from the group comprising: security functions; language translation functions, and document conversion functions, and wherein said sending the second message comprises:
negotiating inbound routing parameters in an inbound routing metric specified in the first message to produce an negotiated inbound routing metric;
determining an outbound channel including one or more outbound intermediaries;
generating an outbound routing metric containing outbound routing parameters to be used by the client to set up the selected outbound channel;
constructing the second message based on the negotiated inbound routing metric and the outbound routing metric; and
dispatching the second message to the client via the main channel.

18. The method according to claim 17, further comprising:
authenticating a designated channel after the designated channel is set up by the client according to the second message, the designated channel being one of the at least one communication channel.

19. The method according to claim 18, wherein said authenticating comprises:
sending an authentication request to the client via the main channel, the authentication request indicating the designated channel to the client;
receiving an echo from the designated channel, the echo being generated by the client based on the authentication request; and
performing authentication of the designated channel based on the authentication request and the echo.

20. A method for a server communicating with a client through at least one channel between the server and the client, the method comprising:
receiving a first message from the client via a main channel to establish communication with the client;
sending the client a second message, constructed based on the first message and requesting the client to set up said at least one channel with one or more intermediaries determined by the client or the server;
communicating with the client through the at least one channel, wherein said communicating comprises:
auditing an outbound channel, if the outbound channel is set up by the client based on the second message, to assess the performance of the outbound channel;
determining whether to opt out of the outbound channel and to set a new outbound channel, if said auditing indicates that the performance of the outbound channel is not satisfactory;
tearing down the outbound channel if the outbound channel is to be opted out of;
establishing, if it is determined to set the new outbound channel after said tearing down, the new outbound channel; and
performing secure communication with the client through at least one channel that connects to the client.

21. The method according to claim 20, further comprising:
receiving a request in the form of an alert signal;
analyzing the request; and
responding to the request by performing a requested operation.

22. The method according to claim 20, further comprising:
sending a request in the form of an alert signal to the client for a response; and
receiving a response from the client.

23. The method according to claims 21 or 22, wherein the request includes at least one of:
an inbound channel set-up request;
an outbound channel set-up request;
an audit request;
an outbound channel opt-out request;
a main channel tear-down request;
an inbound channel tear-down request;
an outbound channel tear-down request;
an all-channel tear-down request; and
a ping request.

24. A method for a client communicating with a server through at least one communication channel between the client and the server, the method comprising:
determining, when an inbound channel is needed to send data to the server, an inbound channel having one or more inbound intermediaries;
sending a first message to the server via a main channel to establish communication with the server, the first message including, if the inbound channel is selected, an inbound routing metric with routing parameters characterizing the inbound channel;

receiving from the server a second message, requesting to set up said at least one communication channel, at least one said channel having one or more intermediaries that are specified in the second message and determined by the client or the server;

setting up the at least one communication channel based on the second message;

communicating with the server through the at least one communication channel, wherein at least one of said one or more intermediaries is selected by said client or said server to perform pre-defined functionality on data passing through it, wherein the predefined functionality is selected from the group comprising: security checking; and document transformation, and wherein the second message includes one or more of:
a negotiated inbound routing metric with inbound routing parameters characterizing the inbound channel having one or more inbound intermediaries selected by the client and negotiated by the server; and an outbound routing metric with outbound routing parameters characterizing an outbound channel having one or more outbound intermediaries selected by the server.

25. The method according to claim 24, wherein said sending the first message comprises:
generating an inbound routing metric containing inbound routing parameters specifying one or more inbound intermediaries and characterizing the inbound channel;
constructing the first message based on the inbound routing metric; and
dispatching the first message to the server via the main channel.

26. The method according to claim 24, further comprising:
authenticating a designated channel after the designated channel is set up according to the second message, the designated channel being one of the at least one communication channel.

27. The method according to claim 26, wherein said authenticating comprises:
receiving an authentication request from the server via the main channel, the authentication request indicating the designated channel; and
sending an echo to the server via the designated channel, the echo being generated based on the authentication request.

28. A method for a client communicating with a server through at least one communication channel between the client and the server, the method comprising:
when an inbound channel is needed to send data to the server, determining an inbound channel having one or more inbound intermediaries;
sending a first message to the server via a main channel to establish communication with the server, the first message including, if the inbound channel is selected, an inbound routing metric with routing parameters characterizing the inbound channel;
receiving from the server a second message, requesting to set up said at least one communication channel, having one or more intermediaries that are specified in the second message and determined by the client or the server;

setting up the at least one communication channel based on the second message; and communicating with the server through the at least one communication channel, wherein said communicating comprises:
verifying the outbound channel, if it is set up based on the outbound metric, to assess the performance of the outbound channel;
determining whether to opt out of the outbound channel and whether to set a new outbound channel, if it is determined that the performance of the outbound channel is not satisfactory;
tearing down the outbound channel if the outbound channel is to be opted out;
establishing, if it is determined to set the new outbound channel after said tearing down, the a outbound channel;
performing secure communication with the server through at least one channel that connects to the server.

29. The method according to claim 28, further comprising: receiving a request in the form of an alert signal; analyzing the request; and responding to the request by performing a requested operation.

30. The method according to claim 28, further comprising:
sending a request in the form of the alert signal to the server for a response; and
receiving the response from the server.

31. The method according to claims 29 or 30, wherein the request includes at least one of:
an inbound channel set-up request;
an outbound channel set-up request;
a verify request;
an outbound channel opt-out request;
a main channel tear-down request;
an inbound channel tear-down request;
an outbound channel tear-down request;
an all-channel tear-down request;
a ping request.

32. A system, comprising:
a client that initiates a communication session;
a server; and
one or more channels, each of which connects the client and the server, at least one of said channels having one or more intermediaries between the client and the server, at least one of the one or more intermediaries being selected by the client or the server to perform pre-defined functionality on data passing through it, wherein the predefined functionality is selected from the group comprising: security checking; and document transformation, and wherein the client comprises:
a receiver for receiving data through at least some of the channels;
an inbound channel selection mechanism for determining an inbound channel having one or more inbound intermediaries;
a client hello message construction mechanism for constructing a client hello message to be sent to the server, said message containing an inbound routing metric characterizing the inbound channel with the one or more inbound intermediaries selected by the inbound channel selection mechanism: and
a channel set up mechanism for setting up either the inbound channel, according to the inbound routing metric, or an outbound channel, according to an outbound routing metric received from the server.

33. The system according to claim 32, wherein the client comprises:
- a receiver for receiving data through at least some of the channels;
- an inbound channel selection mechanism for determining an inbound channel having one or more inbound intermediaries;
- a client hello message construction mechanism for constructing a client hello message to be sent to the server, said message containing an inbound routing metric characterizing the inbound channel with the one or more inbound intermediaries selected by the inbound channel selection mechanism; and
- a channel set up mechanism for setting up either the inbound channel, according to the inbound routing metric, or an outbound channel, according to an outbound routing metric received from the server.

34. The system according to claim 32, wherein the client further comprises:
- a channel verification mechanism for verifying an outbound channel if the outbound channel exists;
- a channel opt out mechanism to opt out of the outbound channel when said verifying of the outbound channel indicates unsatisfactory performance of the outbound channel; and
- a channel tear-down mechanism for tearing down a channel between the client and the server, initiated by the client or by the server through a channel tear-down request.

35. A system, comprising:
- a client that initiates a communication session;
- a server; and
- one or more channels, each of which connects the client and the server, having one or more intermediaries between the client and the server, at least one of the intermediaries being selected by the client or the server to perform a predefined function on data passing therethrough, wherein the server comprises:
- a receiver for receiving data from at least some of the channels;
- an inbound routing metric negotiation mechanism for negotiating inbound routing parameters included in an inbound routing metric received from the client; and
- an outbound channel selection mechanism for determining an outbound channel having one or more outbound intermediaries; and
- a server hello message construction mechanism for constructing a server hello message to be sent to the client, said message containing one or more routing metrics including an negotiated inbound routing metric characterizing the inbound channel and the outbound routing metric characterizing the outbound channel determined by the outbound channel selection mechanism, wherein the server further comprises:
- a channel audit mechanism for auditing the outbound channel; and
- a channel opt out mechanism to opt out of the outbound channel when the auditing the outbound channel indicates unsatisfactory performance of the outbound channel.

36. A machine-accessible medium encoded with a program, the program, when executed, causing:
- initiating a communication session between a client and a server; and
- setting up at least one communication channel between the client and the server, through which the client and the server send each other information via one or more intermediary nodes, at least one such intermediary node being selected by the client or the server to process information passing through said intermediary node, wherein the processing performed on the information by at least one of said intermediary nodes is selected from the group comprising: security checking; and document transformation.
- wherein the at least one communication channel includes an inbound channel, having one or more inbound intermediary nodes selected by the client; and wherein the at least one communication channel includes an outbound channel, having one or more outbound intermediary nodes selected by the server, and wherein:
- an inbound routing metric provides routing parameters that characterize the inbound channel; and
- an outbound routing metric provides routing parameters that characterize the outbound channel, wherein the routing parameters comprise communication path related information including:
- a hop list identifying one or more intermediary nodes and the server that comprise the communication path, and
- an indication of one or more authorized nodes that are allowed to modify the hop list.

37. The medium according to claim 36, wherein the at least one communication channel includes a main channel between the client and the server.

38. The medium according to claim 36, wherein the at least one communication channel includes an inbound channel, having one or more inbound intermediaries selected by the client.

39. The medium according to claim 38, wherein the server negotiates with the client on at least one of the one or more inbound intermediaries selected by the client.

40. The medium according to claim 38, wherein at least one of the one or more inbound intermediaries is identifiable in an inbound routing metric.

41. The medium according to claim 36, wherein the at least one communication channel includes an outbound channel, having one or more outbound intermediaries selected by the server.

42. The medium according to claim 41, wherein the one or more outbound intermediaries are identifiable in an outbound routing metric.

43. The medium according to claim 36, wherein the routing parameters comprise one or more of:
- a routing direction that defines the direction in which the information travels within a channel;
- communication path related information; and
- a routing policy.

44. The medium according to claim 36, wherein the routing parameters comprise communication path related information further include one or more of:
- a length of the communication path measured by the number of hops in the path; and
- a hop list pointer pointing at one of the nodes in the hop list.

45. The medium according to claim 36, wherein the routing parameters comprise an indication of one or more authorized nodes that are allowed to modify a hop list identifying one or more intermediary nodes, wherein the authorized nodes include one or more of:

the server;
the client;
one or more inbound intermediary nodes; and
one or more outbound intermediary nodes.

46. The medium according to claim 36, wherein the routing parameters include one or more of:
a channel ticket used for key establishment between the client and the server, the channel ticket being used by the server to identify which a communication channel to which a connection request pertains; and
an indication of whether a master secret is to be shared by all nodes in a communication channel.

47. The medium according to claim 36, wherein the routing parameters comprise at least one routing policy selected from:
a strict source routing policy under which an intermediary node is not allowed to insert its own intermediary node into the communication path agreed to by the server and the client; and
a loose source routing policy under which an intermediary node is allowed to insert its own intermediary node into the communication path previously agreed to by the server and the client.

48. The medium according to claim 36, wherein the processing performed on the information by the intermediaries is selected from:
language translation;
virus scan; and
document transformation.

49. The medium according to claim 36, wherein said setting up at least one channel comprises:
sending a client hello message from the client to the server via the main channel, the client hello message containing one or more routing metrics;
receiving a server hello message sent from the server to the client via the main channel, the server hello message containing one or more routing metrics which the server generates either on its own initiative or based on negotiation outcome according to the one or more routing metrics initiated by the client;
setting up an outbound channel if an outbound routing metric is identified in the sever hello message; and
setting up an inbound channel if an inbound outing metric is identified in the server hello message.

50. The medium according to claim 36, the program, when executed, further causing:
authenticating a designated channel that is set up via said setting up at least one communication channel;
auditing the outbound channel by the server, after said setting up the outbound channel and said authenticating, to assess the quality of the outbound channel; and
verifying the outbound channel by the client, after said setting up the outbound channel and said authenticating, to assess the quality of the outbound channel.

51. The medium according to claim 36, wherein the program, when executed, further causes:
sending, by the server to the client, an authentication request via the main channel, the authentication request indicating a designated channel to the client;
receiving, by the client, the authentication request;
sending an echo generated based on the authentication request from the client to the server via the designated channel;
receiving, by the server, the echo from the designated channel; and
performing authentication of the designated channel based on the authentication request and the echo.

52. The medium according to claim 36, wherein said data, when executed, further causes:
sending from the server to the client an auditing request via the main channel, and audit data via an outbound channel, hop by hop;
receiving, by the server from the client, a copy of transformed audit data, transformed by one or more intermediaries in the outbound channel based on the audit data, via the main channel; and
determining the performance of the outbound channel based on the audit data and the copy of the transformed audit data.

53. The medium according to claim 36, the program, when executed, further causing:
determining, by the server, whether to opt out of the outbound channel when performance of the outbound channel is not satisfactory; and, based on said determining:
tearing down the outbound channel; and
establishing a new outbound channel.

54. The medium according to claim 36, wherein said program, when executed, further causes:
sending a verification request from the client to the server, via the main channel, with verification data attached to the verification request;
receiving, by the client from the server, a copy of transformed verification data, transformed by one or more intermediaries of the outbound channel and sent via the outbound channel; and
determining the performance of the outbound channel based on the verification data and the copy of the transformed verification data.

55. The medium according to claim 36, the program, when executed, further causing:
determining whether to opt out of the outbound channel when the performance is not satisfactory; and, based on said determining:
tearing down the outbound channel;
establishing a new outbound channel.

56. The medium according to claim 36, wherein
the audit request is sent as an alert signal; and
the verification request is sent as an alert signal.

57. A machine-accessible medium encoded with a program for a server to communicate with a client through at least one communication channel between the server and the client, the program, when executed, causing:
receiving a first message from the client via a main channel to establish communication with the client;
sending the client a second message, constructed based on the first message and requesting the client to set up said at least one communication channel with one or more intermediaries determined by the client or the server;
communicating with the client through the at least one communication channel,
wherein at least one of said one or more intermediaries is selected to perform a predefined function on data passing through it wherein the processing performed on the information by at least one of said intermediary nodes is selected from the group comprising: security checking; and document transformation, wherein said sending the second message comprises:
negotiating inbound routing parameters in an inbound routing metric specified in the first message for setting up an inbound channel to be used to send data from the client to the server, to produce an negotiated inbound routing metric;

determining, if an outbound channel is needed to send data to the client, the outbound channel including one or more outbound intermediaries;

generating an outbound routing metric containing outbound routing parameters to be used to set up the outbound channel;

constructing a second message based on the negotiated inbound routing metric and the outbound routing metric; and dispatching the second message to the client via the main channel.

58. The medium according to claim 57, the program, when executed, further causing:

authenticating a designated channel after the designated channel is set up by the client according to the second message, the designated channel being one of the at least one communication channel.

59. The medium according to claim 57, said program, when executed, further causing:

sending an authentication request to the client via the main channel, the authentication request indicating the designated channel to the client;

receiving an echo from the designated channel, the echo being generated by the client based on the authentication request; and performing authentication of the designated channel based on the authentication request and the echo.

60. The medium according to claim 57, wherein said communicating comprises:

auditing the outbound channel to assess the performance of the outbound channel;

determining whether to opt out of the outbound channel and whether to set a new outbound channel, and, if said auditing indicates that the performance of the outbound channel is not satisfactory;

tearing down the outbound channel; and establishing the new outbound channel.

61. The medium according to claim 57, the program, when executed, further causing:

receiving a request in the form of an alert signal;

analyzing the request; and responding to the request by performing a requested operation.

62. The medium according to claim 61, the program, when executed, further causing:

sending a request in the form of the alert signal to the client for a response; and receiving the response from the client.

* * * * *